United States Patent [19]

Hayashi

[11] Patent Number: 4,868,761
[45] Date of Patent: Sep. 19, 1989

[54] METHOD FOR EVALUATING FREE SURFACE AND NC SYSTEM THEREOF

[75] Inventor: Akihiro Hayashi, Numazu, Japan

[73] Assignee: Toshiba Kikai Kabushiki Kaisha, Tokyo, Japan

[21] Appl. No.: 225,596

[22] Filed: Jul. 27, 1988

Related U.S. Application Data

[63] Continuation of Ser. No. 838,299, Mar. 10, 1986, abandoned.

[30] Foreign Application Priority Data

Mar. 13, 1985 [JP] Japan .................. 60-49688
Mar. 19, 1985 [JP] Japan .................. 60-55078
Mar. 19, 1985 [JP] Japan .................. 60-55080

[51] Int. Cl.$^4$ .................. G06F 15/46; G05B 19/415
[52] U.S. Cl. .................. 364/474.24; 364/191; 364/474.26; 364/474.29; 364/494.31
[58] Field of Search .................. 364/167–171, 364/474, 475, 191–193, 474.22, 474.24, 474.25, 474.26, 474.27, 474.28, 474.29, 474.31; 318/570, 573

[56] References Cited

U.S. PATENT DOCUMENTS

| | | | |
|---|---|---|---|
| 3,882,304 | 5/1975 | Walters | 364/169 |
| 4,152,765 | 5/1979 | Weber | 364/191 X |
| 4,328,550 | 5/1982 | Weber | 364/171 X |
| 4,523,270 | 6/1985 | Kishi et al. | 364/191 |
| 4,556,957 | 12/1985 | Ichikawa | 364/191 X |
| 4,569,014 | 2/1986 | Kishi et al. | 364/191 |
| 4,589,062 | 5/1986 | Kishi et al. | 364/168 |

Primary Examiner—Joseph Ruggiero
Attorney, Agent, or Firm—Koda and Androlia

[57] ABSTRACT

A NC system which is provided with a three-dimensional automatic programming function which comprises a shape data input unit which can input various kinds of shape data including free surfaces, a shape extraction process which obtains a distance from arbitrary position data corresponding to a function which represents a shape in a real space as well as a parametric space for conducting set operations with object structure data on said shape, and a tool path generating unit which generates a trace of a tool base upon the whole shape data inputted from said shape extraction processor.

11 Claims, 27 Drawing Sheets

FIG. 8
FIG. 9
FIG. 11
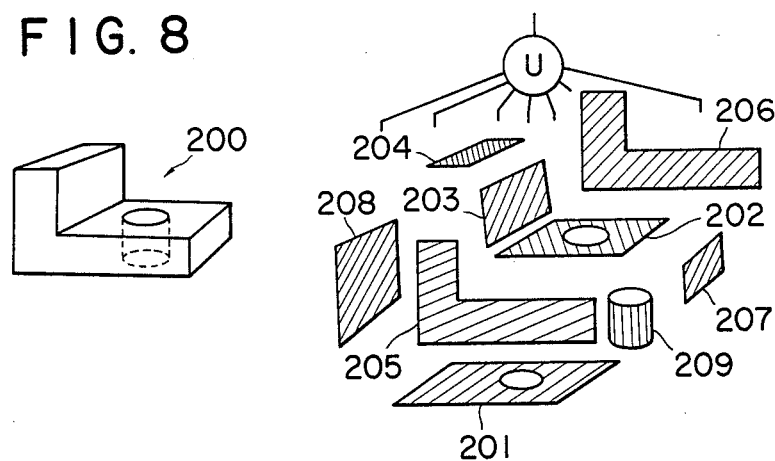
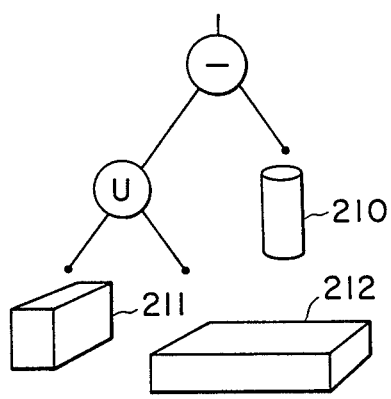

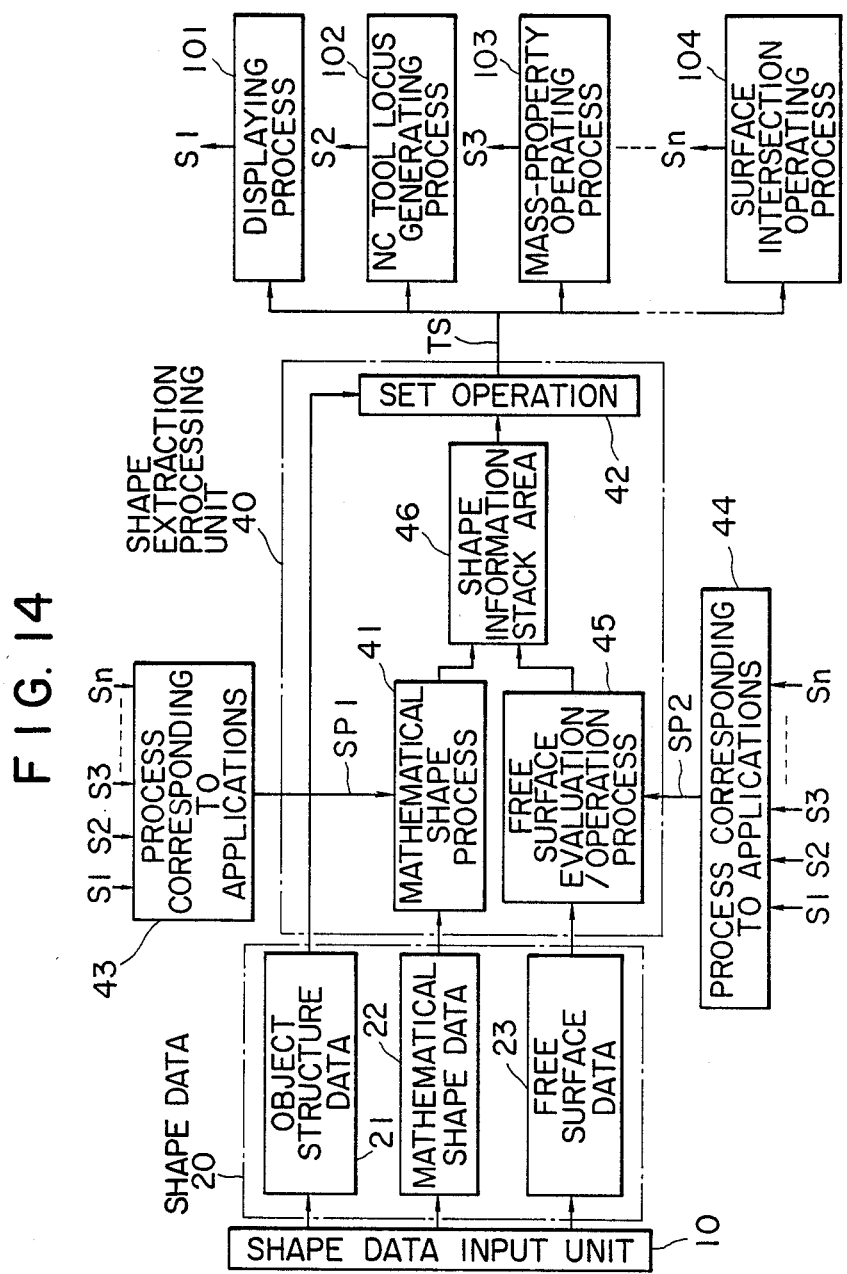

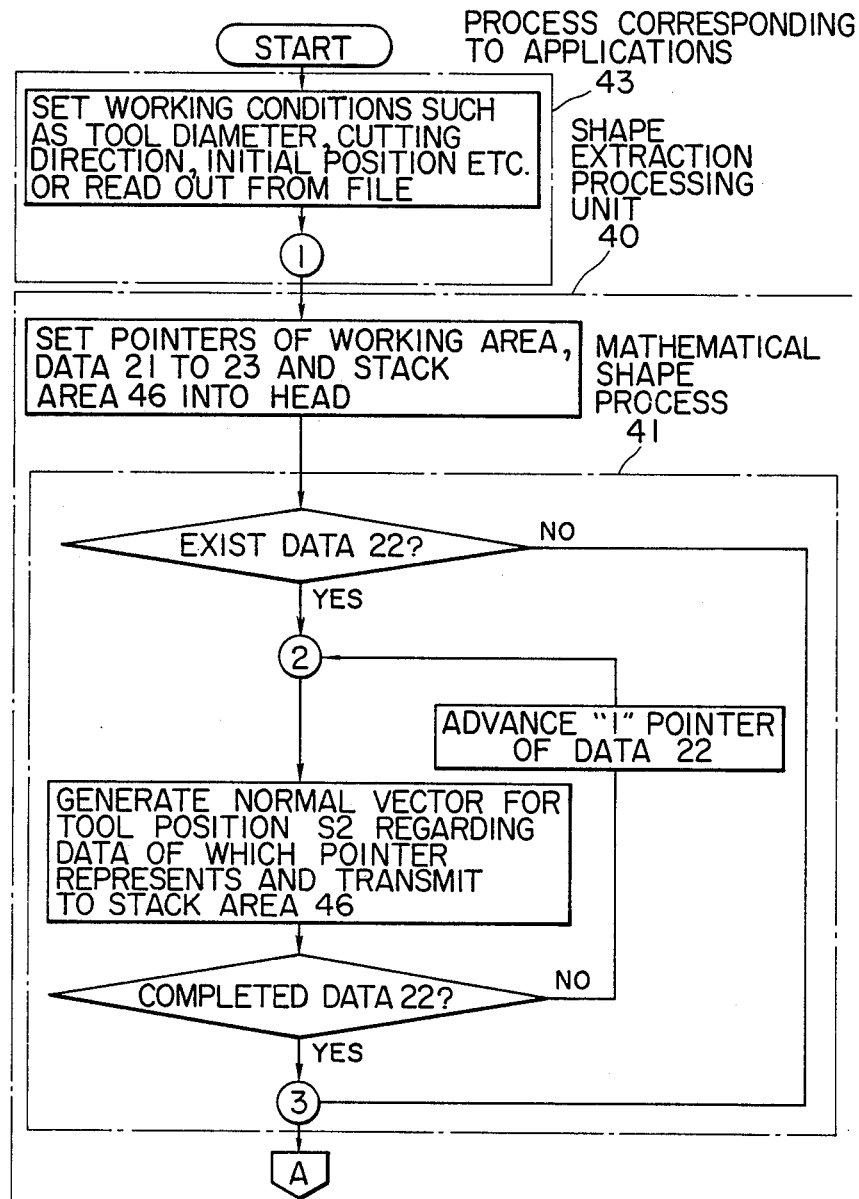

FIG. 22A  FIG. 22B  FIG. 22C
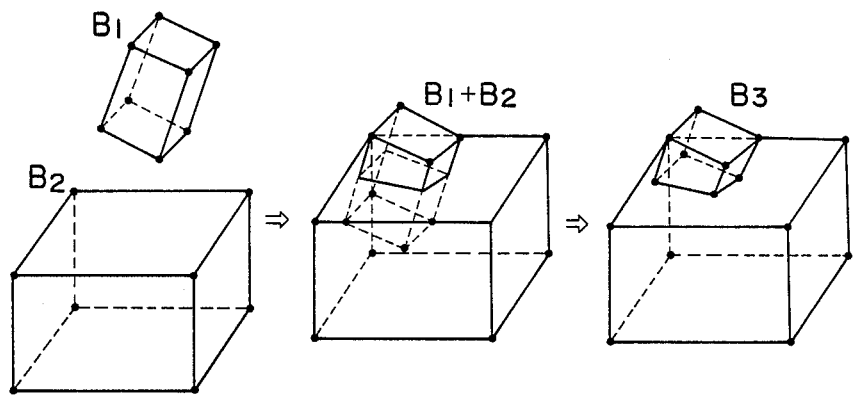
FIG. 23
FIG. 24
FIG. 25
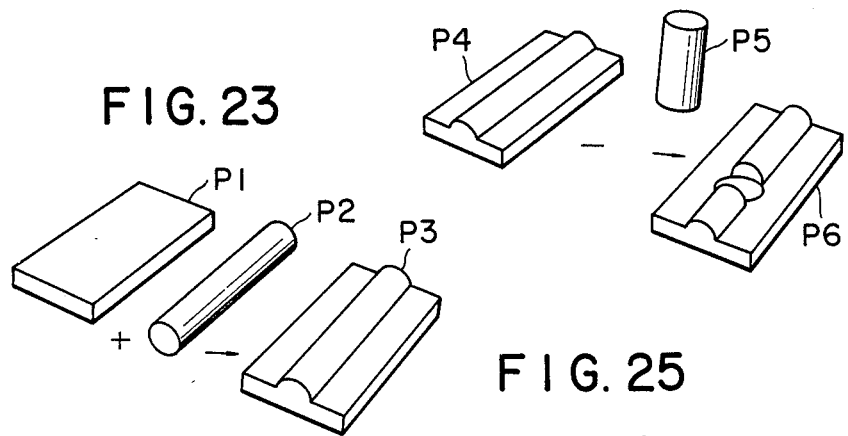

FIG. 33
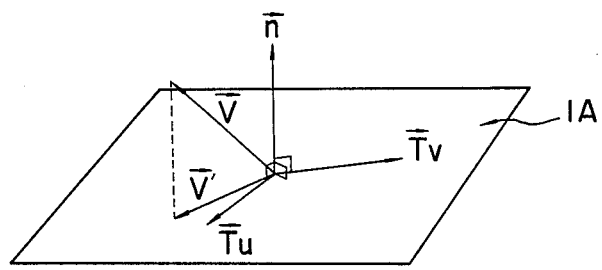
FIG. 34
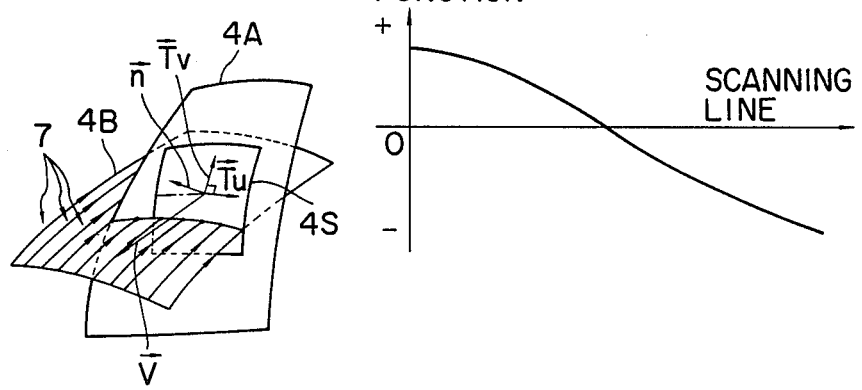
FIG. 35
FIG. 36
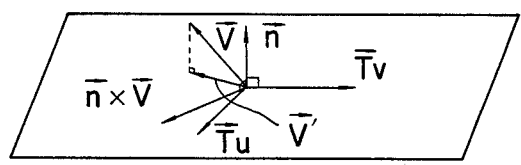

F I G. 37
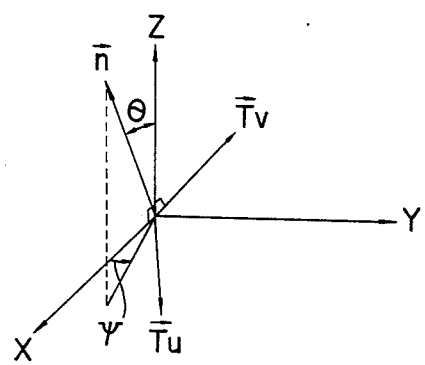
F I G. 38
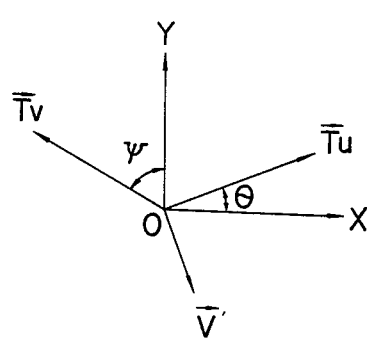
F I G. 39
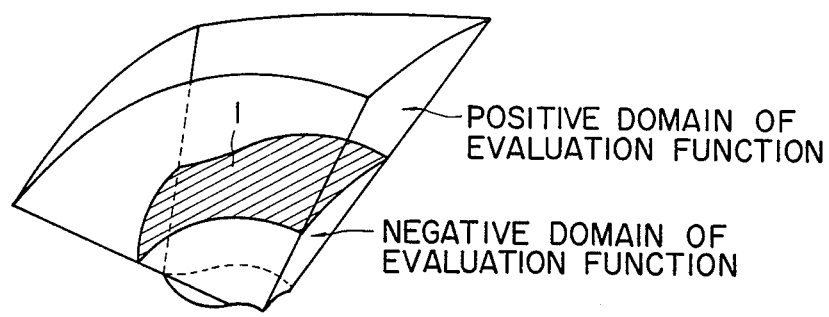

METHOD FOR EVALUATING FREE SURFACE AND NC SYSTEM THEREOF

This is a continuation of application Ser. No. 838,299, filed Mar. 10, 1986, now abandoned.

BACKGROUND OF THE INVENTION

This invention relates to the method for evaluating a free curved surface displayed parametricly in CAD (Computer Aided Design) and CAM (Computer Aided Manufacturing) and the NC (Numerical Control) system thereof, and more particularly to the system with 3-dimensional automatic programing function which is capable of forming a locus for the tools of an NC system.

In the prior art when a shape is defined on a CAD or CAM system, shapes simple enough to be expressed by a mathematical expression are combined to express a desired more complicated form, and the principle of logical operation (set operation) is used usually as the method for combination. In the case of metal dies, however, shapes can not always be expressed with the combination of simple shapes which are mathematically expressible. A shape should therefore be expressed partially with forms which are mathematically expressible and partially by free surfaces which are defined with a set of points in combination. As a conventional set operation is not easily applied to free surfaces, separate algorithms should be used for each shape in processing to form manufacturing data if the form to be processed is a mixture of mathematically expressible portions and free surfaces.

When shapes like metal dies are attempted to be manufactured by utilizing the concept of CAD/CAM which is generally used for NC manufacturing, the system should have the function which can fully and rapidly reflect the know-how of operators such as changes in tool locus. Such a system is required to satisfy the following requisites;

(1) The function to define a shape should completely be separated from the function to generate the locus of a tool.

(2) It can automatically generate the locus of a tool in real time.

(3) The shapes expressed with mathematical expression and the shapes expressed with free surfaces should be processed by a single processor.

(4) The shapes should be able to be processed in combination by set operation.

(5) It can be connected easily with a CAD system.

(6) The system software should be compact.

There have been conducted studies to deal with free surfaces in modeling in order to expand the function of CAD which was originally developed for form modeling. The data structure of a free surface is generally discriminated to recognize it in terms of B-Reps (Boundary Representation) in such a system for standarization of processing methods. But B-Reps needs data structure more complicated than CSG (Constructive Solid Geometry) and involves complex processing. If the set operation is attempted to be included in the functions of CAM, the second requisite above cannot be met. In the shape modeling, mathematical models of 3-dimension objects are stored in a computer in advance, processed to suit a problem and outputted in a suitable expression. There should be prepared mathematical models first. CSG or B-Reps system mentioned above are currently used for this purpose. In the CSG model, closed point set regions are generated within a 3-dimension space as a 3-dimension object shape model by collecting semispace regions or one of the halves of a 3-dimension space which is divided by half with a free surface. In the B-Reps model, on the other hand, closed two-dimensional manifolds are created within a 3-dimension space as a 3-dimensional object shape model by supplying geometric figures data on topologies such as points, sides, curved surfaces of the object and on topological elements such as apexes, sides and curved surfaces. If it is assumed that no figures or shapes of more than 1 value (e.g. an overhang) are processed in the direction of Z-axis, and that the region where the shape exists is defined from the boundary surface only in the direction of Z-axis, the set operation becomes possible by comparing the Z-axis of the basic shape A with that of B as shown in FIG. 1. In other words, in the case of logical OR, the maximum of Z values is selected while the minimum thereof is selected in the case of logical AND in order to obtain a desired shape. However, shapes which do not satisfy the above assumption present difficulties in processing and strictly speaking, the set operation cannot be executed. In the case of CSG, on the other hand, the data structure is simpler and rapid processing seems more feasible.

A free surface is herein defined as a surface which cannot be expressed with any mathematical expressions such as $F(x,y,z)=0$. For instance, as shown in FIG. 2, a surface 1 is expressed in detail if point sets 2 are included in the data structure and the intervals between points in the point sets 2 are interpolated by Coons or Bezier formula. As free surfaces have complicated forms, all the interpolated surface expressions becomes parametric expressions. More particularly, as shown in FIG. 3, the surface 1 can be more precisely expressed by interpolating the real space of an XYZ-coordinate system by using parameters interpolated in a parametric space (uv-coordinate system). In other words, the surface 1 is expressed in a parametric space and therefore it is impossible to recognize the existence of the curved surface within the real space alone. If a curved surface like this is added as another element in CAD or CAM, its relation with other elements such as a sphere or a plane should be examined. But they obviously are an analysis in a real space, presenting an obstacle in handling free surface processing due to the above mentioned reason.

In FIG. 3 the surface 1 existing in a real space is projected in a parametric space wherein boundaries (sides) of the surface 1 correspond respectively with boundaries of a rectangular region 3 which defines a surface region on a parametric space. This leads to the following phenomena. As shown in FIG. 4, even if the surface is interpolated linearly on a parametric space, it is distorted on a curved surface. If it is assumed that the interpolation is for a locus of a tool, the pitches (pick feed) shown by dotted line regions A and B in a real space cannot be maintained constant. It becomes wider at a location and narrower at another location to greatly affect manufacturing efficiency in the process. In practice a specified region A' may be required to be partially processed as illustrated in FIG. 5. However, the real space (A') does not easily correspond with the parametric space (A") in designating the region. A process region A' may be designated in the real space, but it is impossible (in terms of analysis) to cause it to correspond with a parametric space (A"). In the case where a surface is extremely curved as shown in FIG. 6, if conventional parametric interpolation is conducted, the tool locus TT will become as shown in the left figure. In practice, however, the tool locus shown in the right figure should be generated. It is therefore impossible to utilize the prior art parametric interpolation for this purpose.

FIG. 7 shows a conventional system with B-Reps method.

When a solid shape 200 is assumed as shown in FIG. 8, the shape data supplied from a shape data input unit 10 are processed to be decomposed into boundary elements 201 through 209 of a cubic figure as shown in FIG. 9. The shape data is also separated into object structure data 21 which indicate connection among elements, and mathematically expressible shape data 22 which indicate coordinates of apexes of elements the, expression of the sides and the surfaces. If the cubic shape 200 has a free curved surface, it is expressed with aforementioned point sets and interpolated surfaces, but the free surface data 23 on a free curved surface in B-Reps method should always include the data on intersection of the lines. Thus obtained shape data 20 are imputted into a mathematically expressible shape processing unit 30 together with working information 31 such as tool diameter, tool feeding direction, cutting rate and working region of the tool in order to trace the locus with a data pointer. In other words, as the data in B-Reps includes boundary data of shape elements, it is capable of displaying (101) on a display screen such as a CRT, generating (102) tool locus for NC manufacturing or conducting (103) mass-property operational processing to obtain such properties as material and size by tracing the boundaries with dot information. As in the B-Reps a shape such as the cubic shape is decomposed into functions of boundaries, the number of data on the shape unavoidably increases. It sometimes defines a shape which is geometrically impossible or it sometimes makes errors in input by inputting elements to form a cubic shape too fantastic to exist.

The CSG prior art system is shown in FIG. 10 wherein the shape data is inputted by the shape data input unit 10, separated into object structure data 21 and mathematically expressible data 22. These data include the information on the surfaces defining a boundary. The 3-dimensional shape shown in FIG. 8 is therefore decomposed into the shape elements (primitives) 210 through 212 in FIG. 11. If the primitive 210 is substracted from the shapes which have been added with primitives 211 and 212, the 3-dimension shape 200 can be obtained. Since functional information to indicate boundaries are needed in CSG systems, the conventional CSG system cannot deal with free surface data nor include them in the shape data 20. The shape data 20 is fed to a shape extraction processing unit 40 to input space information SP in correspondence with the processing (43) for applications such as locus generation, display and so on, and finally to produce information TS on the whole 3-dimension shape. More specifically, mathematical shae data 22 and space information SP are synthesized by mathematical by expressible shape process 41, and thus synthesized mathematically expressed shape SSP is set-operated (42) with the object structure data 21 to produce the whole shape information TS. This whole shape information TS is processed for screen display (101), generation of locus of an NC tool (102), mass-property operational processing (103) or operational processing with surface intersection (104).

At the same time, application information indicating the process for applications S1 through S4 are outputted to be converted into a space information SP by a process 43 corresponding to applications. The conventional CSG system is detrimental in that its shape data 20 does not deal with free surfaces and hence, the system can not be applied for a shape having a free curved surface, and consequently cannot generate NC tool locus for any shapes including free surfaces.

When the hatched portions in FIG. 12 are expressed as shape data 20 in CSG system, the object structure data 21 is expressed as $P=B-A+C-D$. The mathematically expressible shape data 22 is illustrated as shown in FIG. 13. A circle is mathematically expressed with coordinates of the center and radius, while a rectangle is expressed with lengths of a longer side and of a short side. Necessary length of the data differs depending on a shape. The memory area to store the mathematically expressed data should be long enough to accommodate the maximum length MA. If a shape having the amount of data smaller than the maximum length MA is inputted in the memory, there will be blank areas BM without data.

The data necessary to generate the locus of an NC tool in the system is usually the shape data of the object to be manufactured. Such shape data could be more extensive in scope than those which are expressed mathematically (for instance a sphere) to those which cannot be expressed mathematically such as seen on the body of an automobile (for instance a free curved surface). In the prior art, different systems must be prepared to deal with those two types of shapes. In the case of metal die manufacturing, however, the configurations to be processed are often complicated combinations of those mathematically expressible and those mathematically unexpressible. This type of complicated shapes cannot be expressed unless these two types of shapes are processed in set operation. The conventional separate systems are unable to realize such set operation. Extremely complicated shapes therefore cannot be expressed nor processed to generate the tool locus.

In the NC system in the conventional 3-dimensional automatic programming system, an NC programmer prepares an NC command information for the object to be worked and hands over the information in the form of the NC command tape to a tool operator. If the NC command tape is to be modified in a process, the NC command tape must be returned to the level of NC programming. Even if the NC command tape is returned to that level, the complaint or know-how of the tool operator is not necessarily well understood by the NC operator resulting in insufficient modification. Moreover, a very complicated shape needs an extremely large length of the NC command tape presenting difficulties in handling. As almost all the conventional 3-dimensional automatic programming systems do not store precise geometric information for various forms and figures, the degree of freedom for tool locus generation is too low to realize optimum manufacturing patterns constantly.

SUMMARY OF THE INVENTION

This invention was contrived to obviate aforementioned problems and aims at providing a method with the merits of CSG method which can achieve the same effect in free surfaces as it would obtain when evaluating in a real space and CAD/CAM system.

Another object of this invention is to provide a system to generate NC locus which has the merits of CSG method and yet can achieve the same effect in evaluating free surfaces as it would obtain in a real space.

Still another object of this invention is to provide an NC system provided with 3-dimensional automatic programming function which has the advantages of CSG system and yet can achieve the same high effect on free surfaces as it might obtain in real spaces in order to fully utilize the know-how (manufacturing skill) of tool/machinery operators as well as to facilitate handling of information media.

According to this invention in one aspect thereof, for achieving objects described above, there is provided an evaluation method for free surfaces comprising the steps of: assuming a free surface and arbitrary points on a space; obtaining a distance vector in a manner that the vector at said artitrary point toward and arbitrary point on said free surface exists on a surface normal of said free surface and the distance therebetween is minimum; obtaining a normal vector on said free surface corresponding to said distance vector with a surface interpolation expression of said free surface; and discriminating the polarity from the inner product of said distance vector and said normal vector to thereby differentiate domain of said free surface.

According to this invention in another aspect thereof, there is provided a CAD/CAM system comprising a shape data input unit which can input various kinds of shape data including free surfaces, a shape extraction processor for obtaining the distance of an arbitrary position data from a function which represents the shapes in a real space as well as in a parametric space for conducting set operation with object structure data on said shapes and a display unit for displaying said shapes based on a whole shape data outputted from said shape extraction processor.

Further, according to this invention in another aspect thereof, there is provided an NC unit tool locus generating system which generates tool trace data and supplies data to an NC system, in which NC manufacturing shape data is discriminated into mathematically expressible data, a free surface data or operation code, those discriminated as mathematically expressible shape data is operated for normal vector and the result thereof is stored in a stack, those discriminated as free surface data is operated for normal vector with free surface point set data and the result is stored in said stack, and those discriminated as operation codes are operated in set operation with those stored in said stack to generate whole shape data, and the tool locus is generated for said NC unit by tracing the position which makes the distance from said whole shape data zero.

According to this invention in still another aspect thereof, there is provided a shape modeling system in CAD system comprising a shape data input unit which can input various kinds of shape data including free surfaces, a shape extraction processor which obtains the distance of an arbitrary position data corresponding to a function which represents shapes in a real space and a parametric space and a display which displays said shape based on the whole shape data outputted from said shape extraction processor, in which the shape data inputted from said shape data input unit are stored in a shape data memory, the data on free surface are stored in terms of vector expression, and said free surface is processed by using normal vector generating method so that said free surface can be processed in a manner similar to those applied to shape models which are expressed by mathematical expressions.

Still further, according to this invention in still another aspect thereof, there is provided a plane intersecting line extraction method in CAD/CAM system comprising a shape data/input unit which can input various kinds of shape data having free surfaces, a form extraction processor which obtains the distance of an arbitrary position data corresponding to a function which represents a shape in real and parametric spaces for conducting set operation with object structure data on said shape and a display for displaying said shape based upon the whole shape data outputted from said shape extraction processor, in which an initial scan line is set on a first surface out of the two intersecting surfaces, the points on the first surface are parameterinterpolated, surface normal vector from a second surface is calculated, and when said surface normal vector is not zero, the points on the first surface are displaced along the scan line to correspond with the magnitude of the vectore, and when the surface normal vector is zero, they are stored in a memory as intersecting line coordinates, the next scan line is set consecutively until scanning on the whole surface of the first surface is completed, and the line of intersection between the first and the second surfaces is extracted.

The nature, principle and utility of the invention will become more apparent from the following detailed description when read in conjunction with the accompanying drawings.

BRIEF DESCRIPTION OF THE DRAWINGS

In the accompanying drawings:

FIG. 8 is a view to show an example of cubic shapes;

FIGS. 9 and 11 are views to explain examples of decomposed cubic shape of FIG. 8;

FIG. 14 is a block diagram of an embodiment to realize this invention method;

FIGS. 22A, 22B, 22C and 23–25 are explanatory views of set operation;

FIGS. 28 through 33 are explanatory views of the principle of evaluation on free surfaces according to this invention;

FIGS. 34 through 38 are explanatory views of the specific evaluation of a free surface according to this invention;

FIGS. 39 through 45 are views to describe the method of discrimination of polarity on a free surface;

DESCRIPTION OF THE PREFERRED EMBODIMENTS

Figure 10:
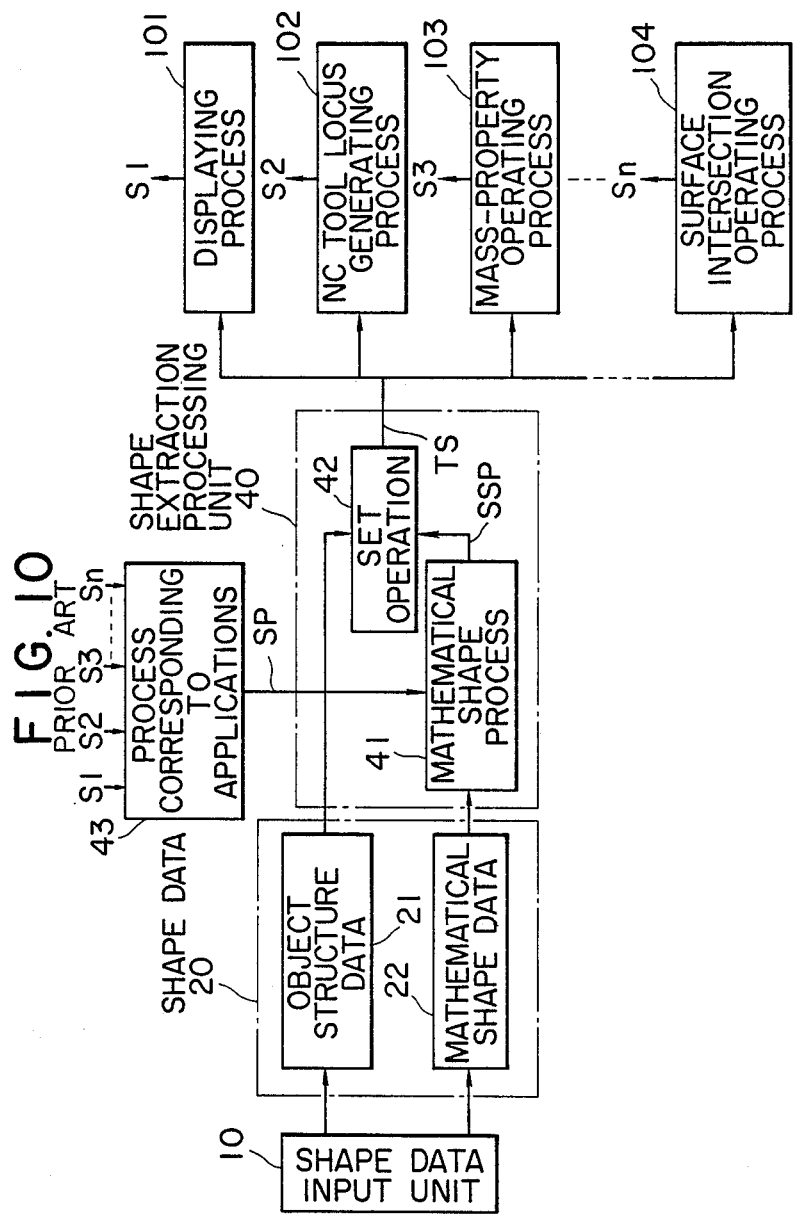
FIG. 10 is a block diagram of a conventional system with CSG method.
Figure 12:
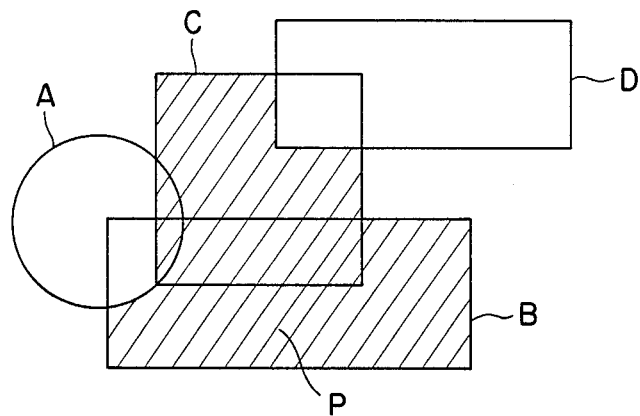
FIGS. 12 and 13 are explanatory views of input of shape data.
Figure 13:
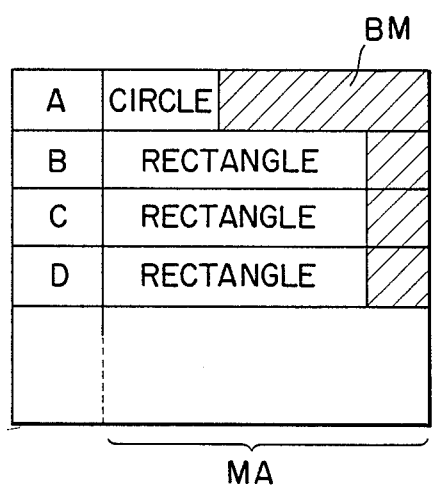

FIG. 14 shows an embodiment of the system which realizes this invention method in comparison with the one shown in FIG. 10 wherein function information on a surface which define boundaries are used as shape data 20 and the free surface data 23 does not include boundary data. The free surface data 23 is processed by a shape extraction processing unit 40 together with space information fed from the processing 44 for applications and then stored in a shape information stack area 46 together with the information from a mathematical shape process 41. All the primitive information is stored in the stack area 46. The stored primitive information are operated with object structure data 21 in a set operation 42 to supply the information TS on the whole shape. A shape should be inputted in a manner which is easily and intuitively understood by operators and yet can express a form fully. In this invention method, input is conducted in a manner which combines input of primitive data and set operation. As a complicated shape is generated in several stages sequentially, operations to transform, add or remove are significant in constructing a shape. In the primitive data input method, simple forms such as a rectangular prism and a column are registered in advance as basic shapes and are taken out whenever necessary. In the set operation method which is also known as Boolean operation, the set operation is conducted for space regions of two shapes which are already defined by primitive data or sweeping. Generally, three types of operations, namely union, difference set and product set are conducted. Difference set may sometimes be replaced with inversion (Negative). By repeating set operations, a complicated shape can be obtained.

Figure 1:
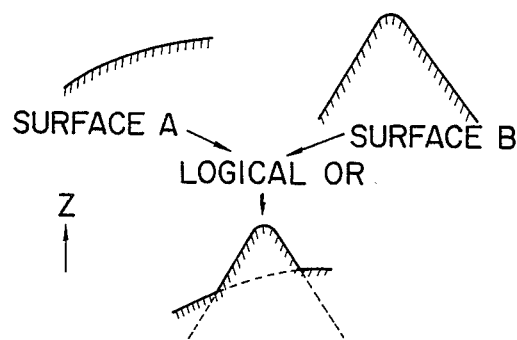
FIG. 1 is an explanatory view for set operation of two-dimensional forms and figures.
Figure 2:
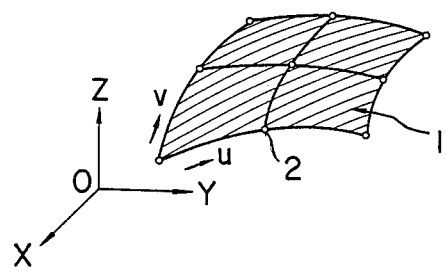
FIG. 2 is a view to show an example of expression of a curved surface with point set.
Figure 3:
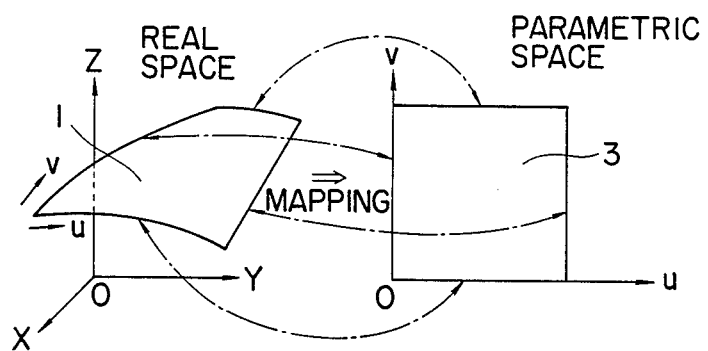
FIG. 3 is a view to shoe the relation between an XYZ-real space and a uv-parametric space.
Figure 4:
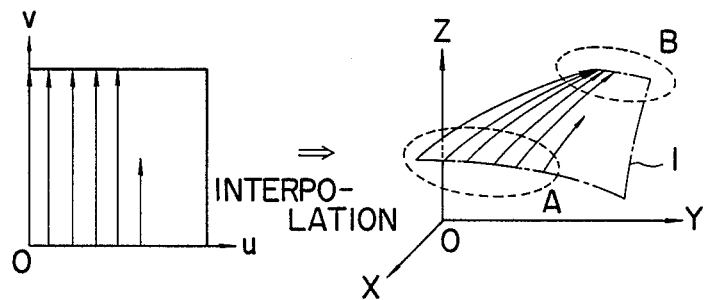
FIGS. 4 through 6 are views to explain the relation between a real space and a parametric space.
Figure 5:
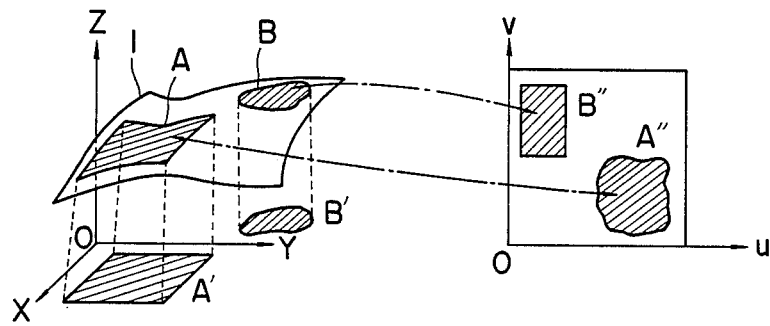
Figure 6:
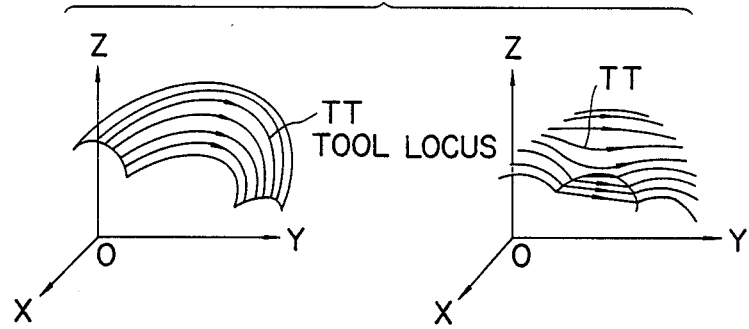
Figure 7:
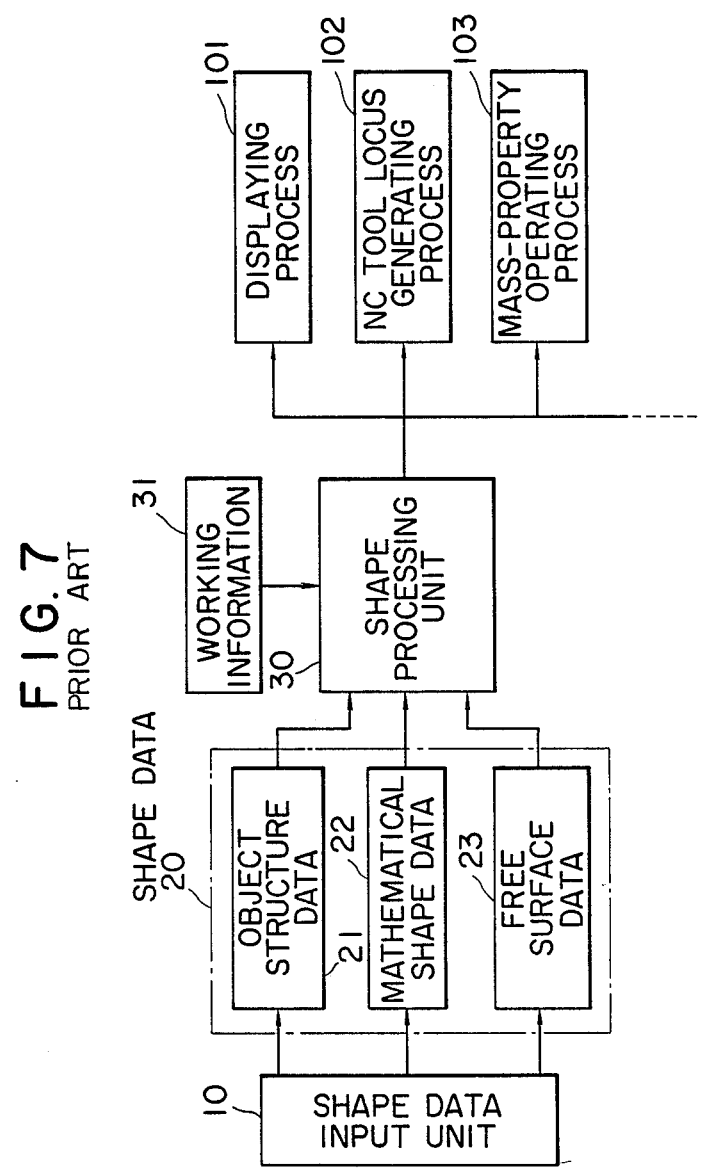
FIG. 7 is a block diagram to show a prior art system for carrying out B-Reps method.
Figure 15A:
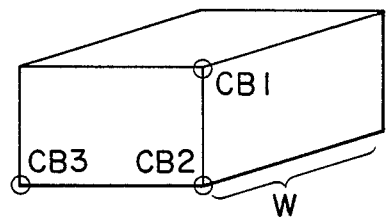
FIGS. 15A and 15B are explanatory view of mathematically expressed data, respectively.
Figure 15B:
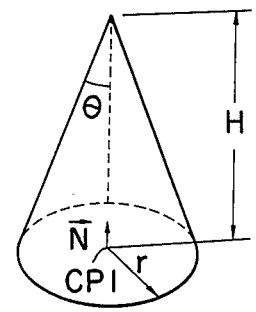

In the above description on two-dimensional shapes the shape data 20 is divided into object structure data 21 and mathematical shape data 22. The mathematical shape data of a sphere is represented in the terms of coordinates of the center point and radius, and a rectangular prism of three points CB1 through CB3 which define a surface and the width W which perpendicularly intersects the surface as shown in FIG. 15A. A column is expressed in terms of the center of the bottom circle and radius, and the unit vector and height in the direction of axis. A circular cone is expressed in terms of the central point CP1 and radius r of the bottom circle and the unit vector $\vec{N}$ and height H in the direction of axis and the angle $\theta$ of the sloped surface as shown in FIG. 15B. Its free surface can be expressed with the number of set points 2 on the boundaries in the uv-directions as shown in FIG. 2. If we consider all of these cubic shapes, the redundancy of the memory capacity at the shape data memory becomes unavoidably large. In order not to waste the memory capacity unnecessarily, the shape data described in the reverse Polish notation (described hereinafter) are sequentially stored in the memory according to this invention. More particularly the memory for the shape data is not divided into two types of data, namely object structure data and mathematical shape data.

Figure 16:
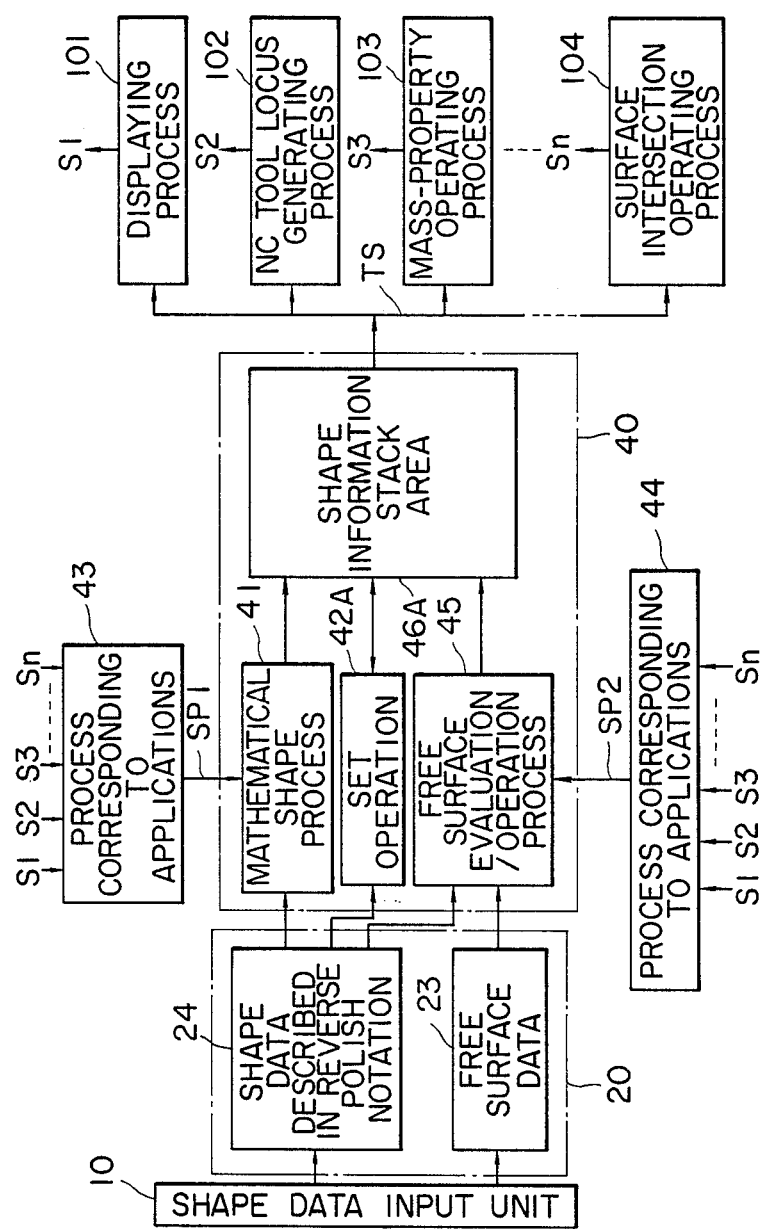
FIG. 16 is a block diagram of another embodiment of the processing system for shape data according to this invention.

An embodiment of a processing system for this purpose is illustrated in FIG. 16.

Namely, the shape data are united and simplified in the form of the shape data 24 described in reverse Polish notation, discriminated by the shape extraction processing unit 40 to mathematically expressed shape data 41, operation code 42A or free surface 45, stored in a shape information stack area 46A by the method which will be described hereinafter, and outputted as the whole shape information TS from the stack area 46A. The shape data 24 described in the reverse Polish notation are in the format shown in FIG. 18 if the form is like the one shown in FIG. 2 wherein mathematical expression shape data are described in the terms "B", "A", "C" and "D". Such the shape data 24 can be obtained by conducting compiler processing 12 which is one of widely used computer software processings on the input (P=B−A+C−D) 11. As the shape data is stored sequentially and orderly from the tip end of the memory area MA, no area on the memory will be wasted. The shape is thus inputted and stored sequentially within the scope of the memory area MA.

Figure 17:
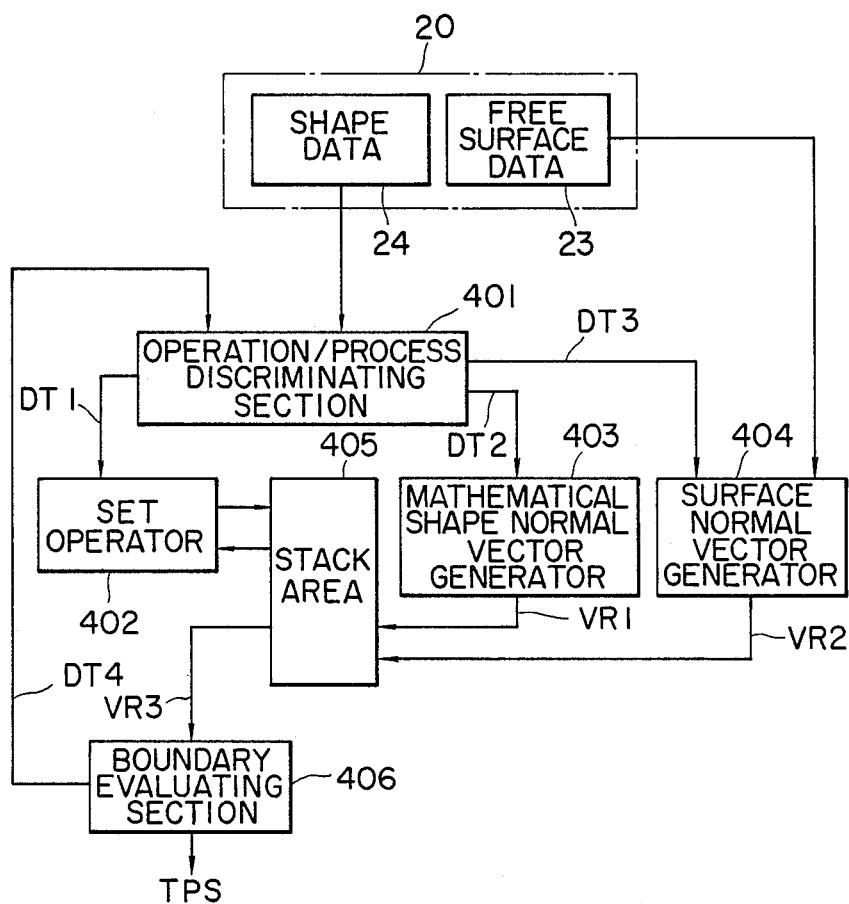
FIG. 17 is a block diagram thereof in more detail.

FIG. 17 shows in detail the method for generating NC tool locus according to this invention wherein the shape data is inputted in an operation/process discriminating section 401 while set point data 23 on free surfaces are inputted at a surface normal vector generator 404. Operation code DT1 which has been discriminated at the discriminating section 401 is inputted at a set operator 402 for set operation with the information stored in the stack area 405. The mathematically expressed data DT2 is inputted at the generator 403 to generate a mathematically expressed normal vector VR1 which in turn is stored in the stack area 405. The shape data DT3 on free surfaces which has been discriminated by the discriminating section 401 is inputted at the surface normal vector generator 404 to generate the surface normal vector VR2 together with set point data 23 which in turn is stored in the stack area 405. The information stored in the stack area 405 is inputted as the shape normal vector VR3 at a boundary evaluating section 406 where the distance DT4 from the figure is calculated in the manner which is described hereinafter. Then the information is inputted in the operation/process discriminating section 401 to output a tool locus TPS in a manner to make the distance DT4 zero.

Figure 18:
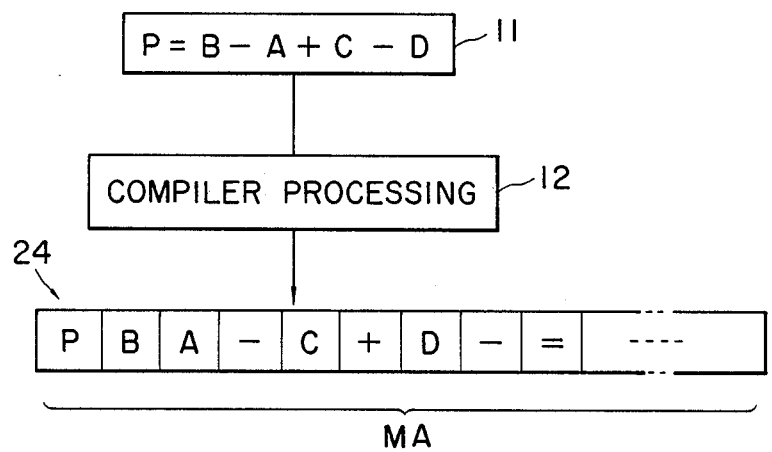
FIGS. 18 through 20 are charts to explain the formation and processing of shape data described in reverse Polish notation.
Figure 19:
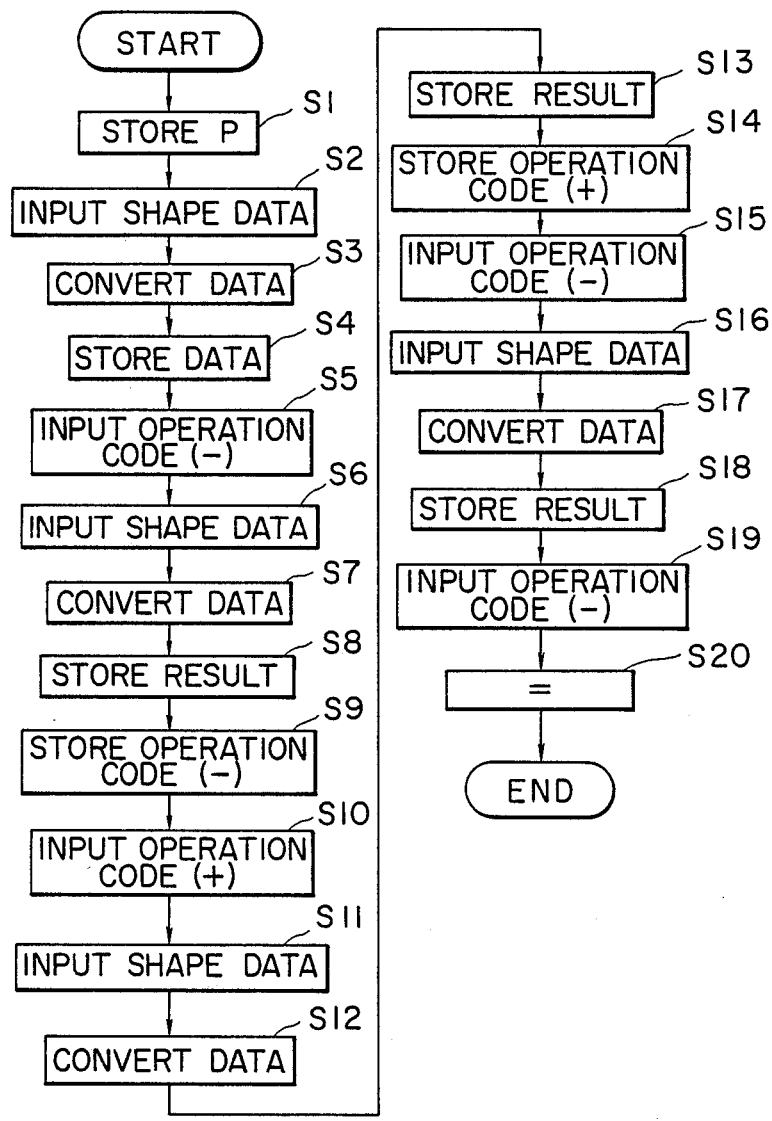

Although FIG. 18 shows an example for obtaining shape data 24 described in the reverse Polish notation as a whole by compiler processing 12, such data may be obtained sequentially according to a flow chart shown in FIG. 19. First "P" which indicates the shape to be inputted is in the form "P", is stored in a memory (Step S1). When the mathematical shape data on a shape B is inputted (Step S2), it is converted to a format suitable for the internal processing of a computer (Step S3), and stored in a memory (Step S4). An operation code (−) is inputted (Step S5), and the mathematical shape data on a shape A is inputted, converted into a suitable format and the result is stored in the memory (Steps S6 through S8). Then, an operation code (−) is stored in the memory (Step S9), and another operation code (+) is inputted therein (Step S10). Further, a mathematical shape data on a shape C is inputted (Step S11), and converted into a suitable format and stored in the memory (Steps S12 and S13). An operation code (+) is stored in the memory (Step S14) and another operation code (−) is inputted therein (Step S15). Similarly the mathematical shape data on a shape D is inputted (Step S16), converted into a suitable format and stored it in the memory. Then an operation code (−) is inputted, and finally "=" is inputted (Steps S17 through S29). The shape data 24 shown in FIG. 18 is generated and stored in the memory which is designated as the shape data input memory.

Figure 20:
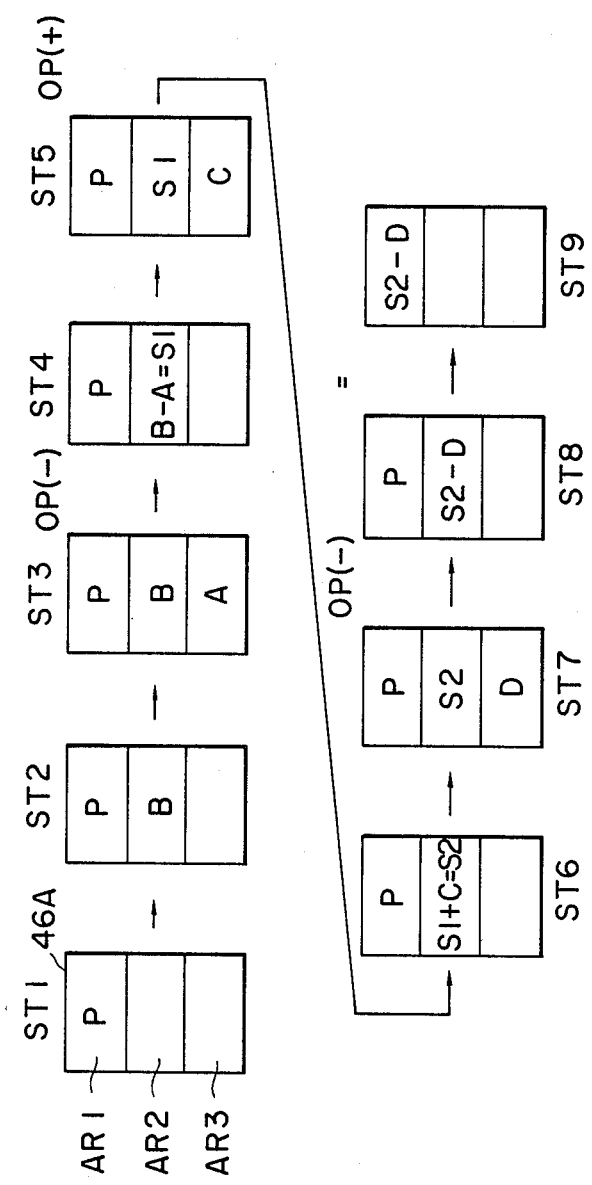

The shape data 24 in reverse Polish notation which is stored in the memory in the aforementioned manner are processed by the shape extraction processing unit 40 so that the whole shape information TS may be stored in the shape information stack area 46A. FIG. 20 shows the stored data wherein information is sequentially transferred from the topmost address of the shape data 24 in a manner to enable their discrimination and classification into the mathematically expressed shape data 41, operation code 42A and free surface 45. The shape information stack area 46A is divided into three areas AR1 through AR3. When the information indicative of the shape P is transferred, it is discriminated to be stored at the area AR1 (Status ST1), and then when a mathematically expressed shape data B is transferred, it is stored at the area AR2 (Status ST2). Then, the next mathematically expressed shape data A is transferred to be stored at the area AR3 (Status ST3). When an operation code (−) is transferred, an operation (B-A) begins at the area AR2 and the result SL is stored at the area AR2 (Status ST4). When the next mathematically expressed shape data C is transferred, it is stored in the area AR3 (Status ST5). When an operation code (+) arrives, an operation of adding the result S1 of the area AR2 and the mathematically expressed shape data C of the area AR3 is conducted and the result (S1+C) is stored at the area AR2 (Status ST6). Then the mathematically expressed shape data D is transferred to be stored at the area AR3 (Status ST7). When an operation code (−) is transferred, the data (S2−D) is operated upon and the result is stored at the area AR2 (Status ST8) and when "=" is transferred, the data (S2−D) or P=B−A+C−D is stored at the area AR1 in the status ST9. The, the shape data P which has been inputted is completely stored at the shape information stack area 46A. This requires smaller capacity of the memory at the shape information stack area 46A.

Figure 21B:
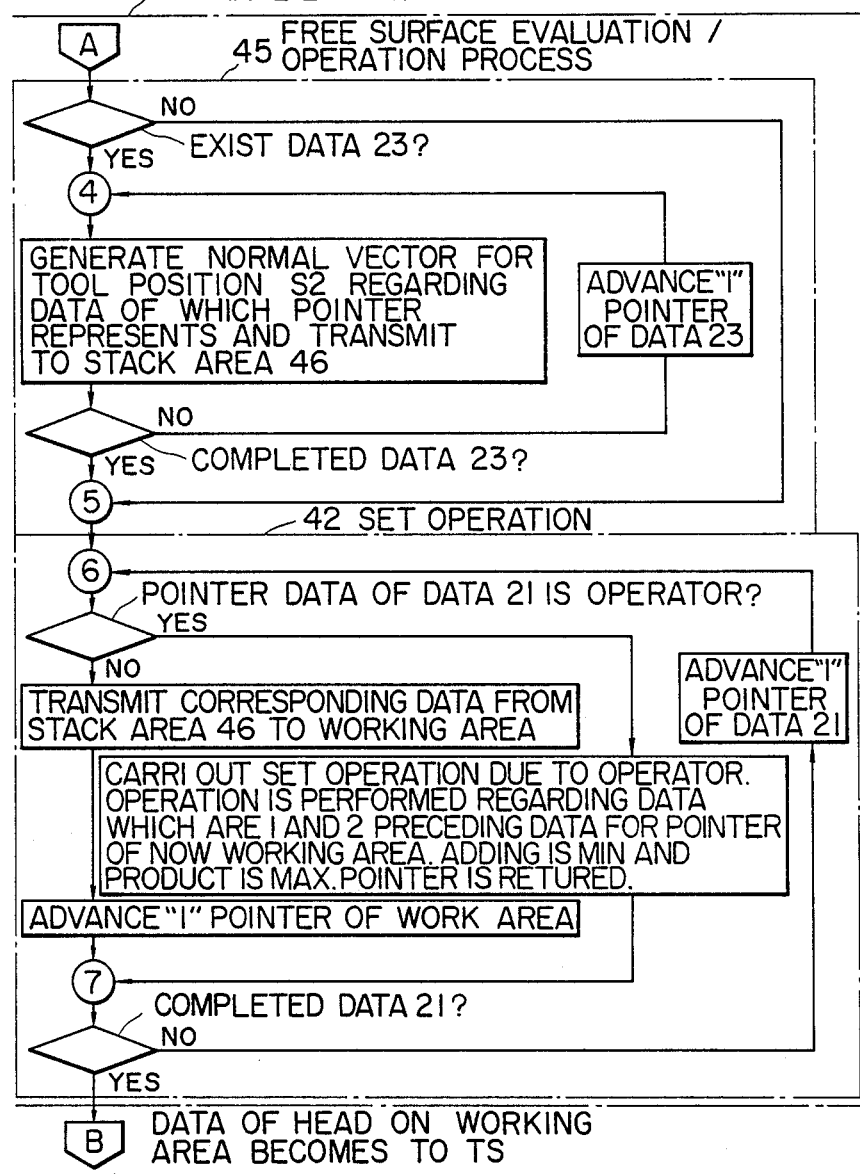
FIGS. 21A thorugh 21C are flow charts to show the operation of the system shown FIG. 14.
Figure 21C:
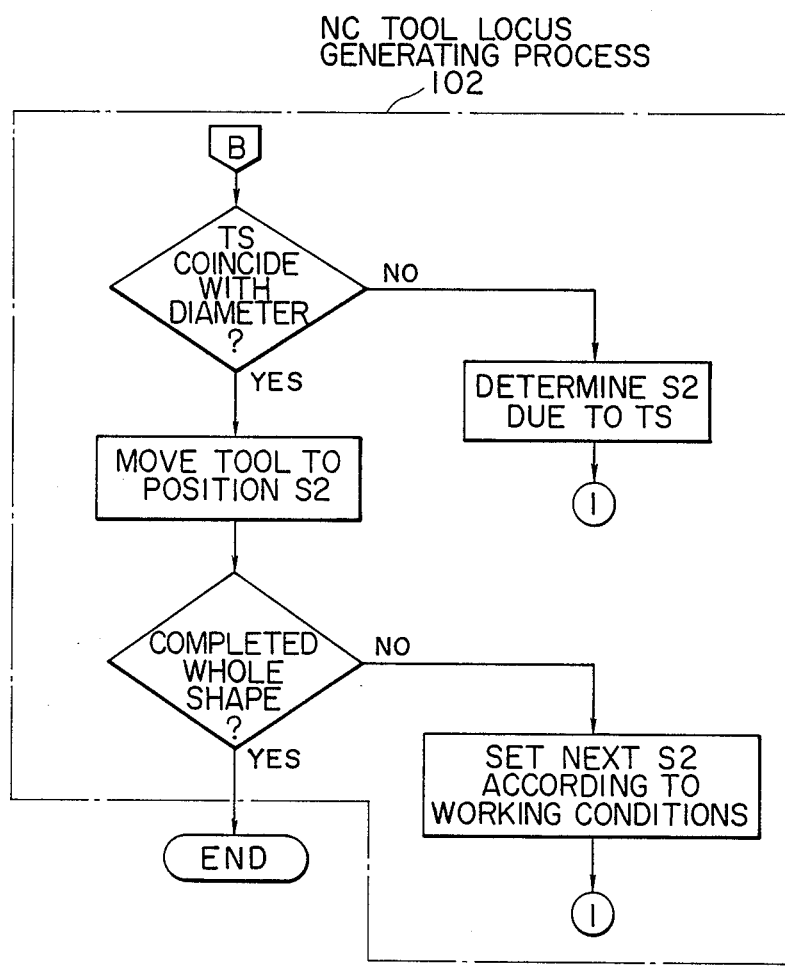

FIGS. 21A through 21C are flow charts to show an operation of the processing system in FIG. 14 and explain the generation of the NC tool locus.

The 3-dimension object shape can be modeled as a subset in 3-dimension Euclid space. As the model represents a physical object, it is a subset internally closed. If it is assumed that a closed region of 3-dimension space corresponding to a given object is denoted as S(X) and its point set S, it can be expressed as follows;

$$S=\{X: X \in S(X)\} \qquad (1)$$

As S(X) is a closed domain, it can be regarded as a set of semi special domains and S can be expressed by a set operation with several subsets. S is decomposed into subsets of $S_i$ ($i=1,2\ldots,n$) and S is consecutively constructed by set operation $\phi_i$ using these subsets. The set operation $\phi_i$ used herein are of union, difference set and product set. S can be then expressed as follows:

$$\left. \begin{array}{rcl} P_1 & = & \phi_i(P_{i-1}, S_i) \\ P_1 & = & S_1 \\ S & = & \phi_n(P_{n-1}, S_n) \end{array} \right\} \qquad (2)$$

$(i = 2, 3, \ldots, n)$ $\phi_i$ will be $P_i=\phi(P_{i-1}, S_i)=S_i \cup P_{i-1}$ in the case of the operation union, $P_i=\phi_i(P_{i-1}, S_i)=S_i \cap P_{i-1}$ in the case of the operation of productset and $P_i=\phi_i(P_{i-1}, S_i)=P_{i-1}-S_i=P_{i-1}\cap \overline{S_i}$ ("∼" expresses the operation of complementary set) in the case of the operation of difference set. $S_i$ is expressed with the product of several subsets and $S_i$ is internally closed as below $$S_i = S_{i1} \cap S_{i2} \cap \ldots \cap S_{im} \qquad (3)$$

If $S_{ij}$ of the expression (3) is made to correspond to a semi spatial domain, the following expression is obtained.

$$S_{ij}=\{X: f_{ij}(X) \geq 0\} \qquad (4)$$

Thus a 3-dimension object is expressed in a mathematical model in a semi-spatial domain. In the shape modeling, one or several $S_{ij}$ ($j=1,2,\ldots,m$) which is a subset of $S_i$ expresses a semi-spatial domain with analytic characteristic, and the remaining subsets are frequently used to close the semi-spatial domain. $S_i$ is named after such characteristics and the types of $S_i$ which have been prepared in advance are called primitive respectively. The process of set operation of topology model is now described hereinbelow.

It is assumed that there are two 3-dimension objects $B_1$ and $B_2$ as shown in FIG. 22A and each of the objects has six surfaces, twelve sides and eight apexes.

object $B_1$:

$F_1=6$, $E_1=12$, $V_1=8$, $H_1=0$, $R_10$, $B_1=1$ object $B_2$:

$F_2=6$, $E_2=12$, $V_2=8$, $H_2=0$, $R_2=0$, $B_2=1$

Wherein F denotes surface, E side, V apex, H hole, R hole contour (ring), B=cubic. This satisfies the formula of Euler Poincaré or the necessary condition of a polyhedron.

$$V-E+F-R+2H-2B=0 \qquad (5)$$

If these two objects are superposed as shown in FIG. 22B, and the sum thereof is obtained, a shape $B_3$ is formed. The shape $B_3$ can be expressed as $F_3=11$, $E_3=24$, $V_3=16$, $H_3=0$, $R_3=1$, $B_3=1$.

This satisfies the formula of Euler Poincaré, too. This means a processing is necessary to make the condition that "$B_3$"=(16, 24, 11, 0, 1, 1) when "$B_1$"+"$B_2$", and "$B_1$"=(8, 12, 6, 0, 1) and "$B_2$"=(8, 12, 6, 0, 0, 1) as expressed below;

"τ"=(0, 0, −1, 1, 0, −1)

Wherein each component satisfies (v,e,f,r,h,b) "τ" processing is to erase one cubic surface and to form one hole contour. As $R_1=0$ and $R_2=0$, the relation $R_3=1$ holds. Although R is defined as a hole contour, this should means intersection line between one cubic and another cubic. This further indicates that in order to conduct a set operation in a topology model (connection relation model), an intersecting line between symmetrical two cubics must be obtained. FIGS. 23 through 25 show an example of set operation of primitive modeles. FIG. 23 shows the process of forming a shape model P3 by obtaining the sum of the primitives P1 and P2. FIG. 24 shows the process of another shape model P6 by obtaining the difference between the primitives P4 and P5 while FIG. 25 shows the process of forming still another shape model P9 by obtaining the product of the primitives P7 and P8.

Figure 26:
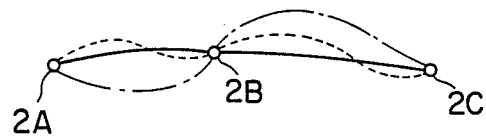
FIG. 26 is an explanatory view of interpolation on a surface.

Free curved surfaces can generally be expressed with sets of points on a surface. As shown in FIG. 2, the point sets 2 are smoothly connected to express the whole shape of the surface. For facilitating understanding, two-dimensional point arrays (nodes) are assumed to be present as shown in FIG. 26. The number of curves which always pass nodes 2A through 2C to smoothly connect them is infinite., and it is necessary to have a curve expression which always defines one curve out of the group of curves. If it is assumed here that the number of nodes, is $\underline{n}$, the expression for the curve should be a poly-nominal of the degree (n−1) to satisfy the aforementioned conditions. However, the higher is the degree of the poly-nominal, the more the curve vibrates due to Lange effect. This effect may be alleviated by using a poly-nominal of low degree which connects nodes partially in several units. This is local interpolation or spline interpolation. The spline interpolation expresses an interval between nodes by a poly-nominal of low degree. If the number of nodes is $\underline{n}$, the poly-nominal of the degree (n−1) will be obtained. The continuation of the whole expression will be easily maintained by making end conditions of adjacent expressions coincide with each other on nodes.

Figure 27:
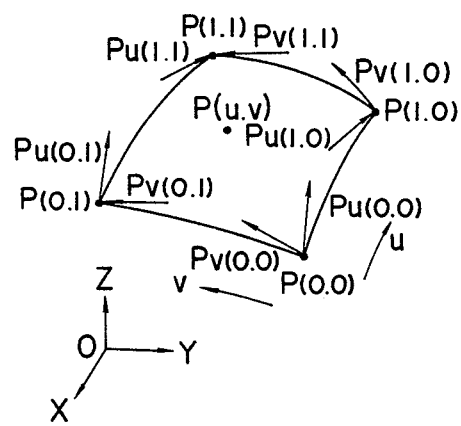
FIG. 27 is an explanatory view of Coons interpolation formula.

In the case of surfaces, a surface expression is formed by treating a surface defined by four nodes as one unit (referred to as one patch), and the continuation among expressions is maintained on the boundaries of these patches in the manner similar to the above two-dimensional case (provided there is needed observation for three-dimension). The surface expression may generally be either one of Coons' expression, Bezeir's expression and B-Spline patch. The Coons' expression holds for the surface P (u,v) shown in FIG. 27 on the following conditions;

$$P(u,v) = [F_0(u), F_1(u), G_0(u), G_1(u)] \vec{B} \begin{bmatrix} F_0(v) \\ F_1(v) \\ G_0(v) \\ G_1(v) \end{bmatrix} \quad (6)$$

where $$\vec{B} = \begin{bmatrix} P(0,0) & P(0,1) & Pv(0,0) & Pv(0,1) \\ P(1,0) & P(1,1) & Pv(1,0) & Pv(1,1) \\ Pu(0,0) & Pu(0,1) & Puv(0,0) & Puv(0,1) \\ Pu(1,0) & Pu(1,1) & Puv(1,0) & Puv(1,1) \end{bmatrix}$$

$$F_0(t) = 2t^3 - 3t^2 + 1, \quad G_0(t) = t^3 - 2t^2 + t$$

$$F_1(t) = -2t^3 + 3t^2, \quad G_1(t) = t^3 - t^2$$

This Coons' interpolation expression is a vector expression which does not exist on coordinates in real space. It uses parametric representation which has demerit that it cannot represent clearly the relation between the parametric space and the real space although it quite advantageously represents a complex expression in a simplified form. In other words, the parameters given to the expression in a parametric space cannot be evaluated in the real space at all. The object, however, exists in the 3-dimension space and should therefore be evaluated in the space.

Although such a free surface as seen on a metal die exists in the same coordinate system as the shapes which can be expressed with mathematical expressions, they are unavoidably estimated in two separate spaces. In order to obviate such an inconvenience, this invention attempts to deal with free surfaces in the same space as the shapes which can be mathematically expressed.

Figure 28:
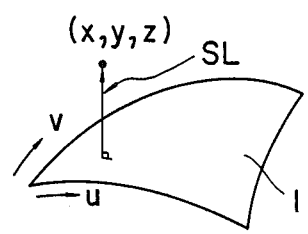

Referring to FIG. 28, this invention method tries to operate what positional relation coordinates (x,y,z) designated in a real space has against a parametrized (u,v) surface 1. The operation uses a convergence method which will briefly be described hereinafter.

Figure 29:
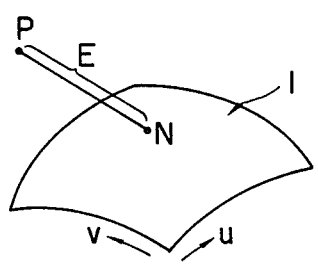
Figure 30:
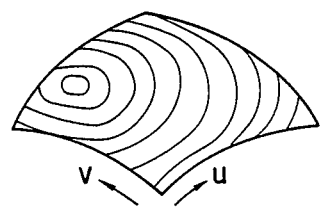
Figure 31:
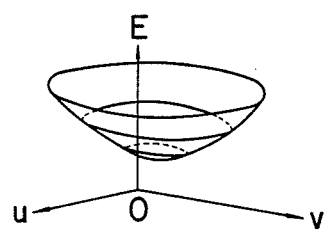

The basic concept lies in the realization of evaluation of a space in a free surface in a semi-spatial domain. As shown in FIG. 29, it is assumed that a point P exists above a free surface and the distance from an arbitrary point N on the surface 1 to the given point P is denoted as E. Contour lines of the distance E can be drawn on the surface 1 as shown in FIG. 30 by calculating the distances between the point P and all the points N which exist on the surface 1 and connecting the points on the surface where the distance E has the same values. FIG. 31 shows the relation on the axis E and the system axes u,v, on the surface which gives the function of the distance from the surface 1 to the given point P or ψ(u,v). Then, directional differential coefficiency in the direction u on the surface 1 can be expressed as below;

$$\frac{\partial \psi}{\partial u} = u \cdot \nabla \psi \quad (7)$$

The relation below holds if it is assumed that a unit vector is denoted as $\vec{u}$, and the angle formed with grad ψ as $\theta_1$.

$$\frac{\partial \psi}{\partial u} = |\nabla \psi| \cdot \cos\theta_1 \quad (8)$$

Similarly, the relation holds as below in the direction v.

$$\frac{\partial \psi}{\partial u} = |\nabla \psi| \cdot \cos\theta_2 \quad (9)$$

The following conditions should be satisfied to obtain the minimum value of the potential functions.

$$\frac{\partial \psi}{\partial u} = 0 \text{ and } \frac{\partial \psi}{\partial v} = 0 \quad (10)$$

$$\frac{\partial \psi}{\partial u} = |\nabla \psi| \cdot \cos\theta_1, \frac{\partial \psi}{\partial v} = |\nabla \psi| \cdot \cos\theta_2 \quad (11)$$

Since the above relation (11) holds, if $|\nabla \psi| \neq 0$, the relation should be held as $\cos\theta_1 = 0$, and $\cos\theta_2 = 0$ Therefore, $\theta_1 = 90°$ and $\theta_2 = 90°$. a $\theta$ is an angle formed between respective directions and $\text{grad}\psi$, the minimum value E of the potential functions is the distance from the point P in the surface normal direction.

The potential minimum denotes the minimum distance between the point and the surface and is used as a value to evaluate a parametric surface spacially. If the surface interpolation expression is denoted as $\rightarrow Q (u,v)$, the potential value will be expressed as below;

$$\psi(u,v) = |\vec{P} - \vec{Q}(u,v)| \quad (12)$$

If the direction where potential generates is added, the relation will becomes as below;

$$\vec{\psi}(u,v) = \vec{P} - \vec{Q}(u,v) \quad (13)$$

If it is assumed that a point on the surface having the potential minimum is u1,v1, the potential vector is expressed as $$\vec{\psi}^*u_1,v_1) = \vec{P} - \vec{Q}(u_1,v_1) \quad (14)$$

As the surface normal on the point u1,v1 which gives the potential minimum and the direction of $\vec{\psi}(u1,v1)$ coincides, if the surface normal vector of u1, v1 is expressed as $\vec{n}$, the sign of the potential can be determined by operating with the following expression and consequently, the orientation of the semi-spatial domain can be determined.

$$S = \vec{\psi}(u_1,v_1) \cdot \vec{n} \quad (15)$$

The semi-spatial domain can be differentiated from the free surface by obtaining the parameters (u1,v1) on the surface with potential minimum. However, as it is impossible to obtain (u1,v1) analytically, a search method should be introduced. More particularly, if a point (u0, v0) is set on surface as the search initial point, the minimum of the $\psi(u0, v0)$ exists obviously in the direction of $-\text{grad}\psi(u0, v0)$ $$-\text{grad}\psi(u_0, v_0) = -\nabla\psi = -\frac{\partial \psi}{\partial u}\vec{u} - \frac{\partial \psi}{\partial v}\vec{v} \quad (16)$$

as $\frac{\psi}{u} = |\nabla\psi| \cos\theta$, the relation holds as below:

$$-\nabla\psi = \quad (17)$$

$$-\vec{u} \cdot |\nabla\psi| \cdot \cos\theta_1 - \vec{v} \cdot |\nabla\psi| \cdot \cos\theta_2$$

This indicates that the solution lies in the direction of $(-|\nabla\psi| \cos\theta, -|\nabla\psi| \cos\theta_2)$. $\psi(u0,v0)$ is obviously the distance from the given point P, the positions to be obtained next will be;

$$u_1 = -\psi(u0,v0) \cdot |\nabla\psi| \cos\theta_1 + u_0$$

$$v_1 = -\psi(u0,v0) \cdot |\nabla\psi| \cos\theta_2 + v_0 \quad (18)$$

If it is assumed that $\vec{X} = (u,v,)$, the above expression (18) will generally be expressed as below;

$$\vec{X}_i = -\vec{\psi}(\vec{X}_{i-1}) \cdot \nabla\psi(\vec{X}_{i-1}) + \vec{X}_{i-1} \quad (19)$$

$\psi(\vec{X}_{i-1})$ denotes a search step and $-\nabla\psi(\vec{X}_{i-1})$ a search direction. The next search position is obtained according to the above expression and the relation below is monitored for each search position; $S = (\vec{P} - \vec{Q}(\vec{X}_i)) \cdot \vec{n} = S(\vec{n}$ is a surface normal) $X_i$ becomes the position with the potential minimum when $S \approx 1$ or $S \approx -1$.

Figure 32:
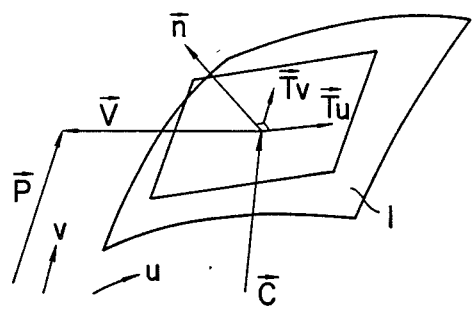

As shown in FIG. 32, a surface 1 is represented with two parameters u and v, in the expression $\vec{C} = \vec{S}(u,v)$ while the positional vector of a point which is arbitrarily designed in a real space is expressed as $\vec{P}$. If the initial parameter is denoted as Pu, Pv), the positional vector $\vec{C}$ on the surface 1 will be expressed as below.

$$\vec{C} = \vec{S}(Pu,Pv) \quad (20)$$

the vector $\vec{V}$ this time will become $$\vec{V} = \vec{P} - \vec{C} \quad (21)$$

If the relation of the vector V holds as below, $$\vec{n} = \delta\vec{C}/\delta u \times \delta\vec{C}/\delta v \quad (22)$$

$$\vec{n}/|\vec{n}| \approx \vec{V}/|\vec{V}| \quad (23)$$

$|\vec{V}|$ exists at a point which has the minimum distance from the surface 1 to the arbitrary point. Explanation will now be given to the method to obtain the parameters (Pu,Pv) which satisfy the above expression (23). FIG. 33 shows a tangent plane 1A of the surface 1 on the point of the parameter (Pu,Pv) wherein tangent vectors exist on the tangent plane 1A in the respective directions u and v. $\vec{V}$ as projected on the tangent plane 1A and the direction of vector can be calculated according to the formula below (24) and the formula (25).

$$\vec{V}' = (\vec{n} \times \vec{V}) \times \vec{n} \quad (24)$$

$$\vec{V}' = |\vec{V}|\sin\theta \cdot \vec{V}' / |\vec{V}'| \quad (25)$$

Components are calculated in the directions of tangent vectors ($\vec{Tu}, \vec{Tv}$) of the directions u and v which exist on the tangent plane 1A. If it is assumed that the components in each direction are denoted as TU and TV, the angles formed between $\vec{Tu}$ and the x-axis and between $\vec{Tv}$ and the y-axis as $\theta$ and $\psi$, the following relation holds.

$$TU = V' \times \cos\theta - Vy \sin\theta \quad (26)$$

$$TV = V' \times \sin\psi - Vy \cos\psi \quad (27)$$

It can be reasonably said that the parameter obtained by displaying the initial parameter by the amount suitable for the above TU and TV represents a surface position which satisfies the above expression (23) at higher possibility. The parameter is calculated as below if the length of boundaries on the surface in the directions u and v are DU and DV, respectively.

$$PUnew = PU \times TU / DU \quad (28)$$

$$PVnew = PV \times TV / DV \quad (29)$$

The process will return to the expression (2) again with the above result to repeat the processing until the expression (23) is fully satisfied. $|\vec{V}|$ which satisfied the expression (23) represents the distance form the surface. But this does not identify on which surface the direction exists, and therefore the polarity should be specified as described below.

The processing which has been explained in terms of general vector expressions will now be described in more concrete terms. The evaluation functions to obtain the data having the characteristics similar to those shown in FIG. 33 are the distance vectors $\vec{n}$ in the normal direction on the tangent planes 4S in FIG. 34. A point C on the surface 4a is represented as the parameters u and v.

$$\vec{C} = \vec{S}(u,v) \begin{cases} x = Sx(u,v) \\ y = Sy(u,v) & 0 \le u \le 1 \\ z = Sz(u,v) & 0 \le v \le 1 \end{cases} \quad (30)$$

The relation below holds if an arbitrary point on the scanning line 7 is set as $\vec{P}$, a search initial point on each patch to be scanned and the parameters of an initial point denoted as $u_1$ and $v_1$.

$$\left. \begin{array}{l} x_1 = Sx(u_1,v_1) \\ y_1 = Sy(u_1,v_1) \\ z_1 = Sz(u_1,v_1) \end{array} \right\} \vec{C} \quad (31)$$

The distance vector between an initial point and an arbitrary point is then obtained.

$$\vec{V} = \vec{P} - \vec{C} \quad (32)$$

If the relation above holds on this vector $\vec{V}$, $$\vec{n} = \frac{\partial \vec{S}(u,v)}{\partial u} \times \frac{\partial \vec{S}(u,v)}{\partial v} \quad (33)$$

$$\frac{\vec{n}}{|\vec{n}|} \approx \frac{\vec{V}}{|\vec{V}|} \quad (34)$$

then $|\vec{V}|$ is an evaluation function. FIG. 35 shows the evaluation on the scan line 7. The above expression (33) indicates the calculation for outer product of the u-direction tangent vector and v-direction tangent vector with the parameters u1 and v1. This becomes the surface normal vector $\vec{n}$. Similarily to the case of two-dimension, the above expression (34) cannot be solved with one time processing. The step therefore should proceed to the next. This processing is to project $\vec{V}$ on the tangent plane 4S which is a plane where the u,v tangent vector exists of the coordinate system comprising the u,v tangent vector and the normal vector $\vec{n}$. FIG. 36 shows projection processing on the tangent plane 4S.

$$\vec{V}' = (\vec{n} \times \vec{V}) \times \vec{n} \quad (35)$$

In other words, the direction of projected vector is obtained by the calculation according to the expression above and then the magnitude of V is determined according to the expression below.

$$\vec{V} = \frac{\vec{V}'}{|\vec{V}'|} \left\{ |\vec{V}| \cdot \sqrt{1 - \left( \frac{\vec{V}}{|\vec{V}|} \cdot \frac{\vec{n}}{|\vec{n}|} \right)^2} \right\} \quad (36)$$

Tu and Tv components corresponding to the ($\vec{Tu}$, $\vec{Tv}$, $\vec{n}$) coordinate systems are calculated for thus obtained V. As the Tu and Tv axes do not coincide with orthogonal coordinate system of xyz, a process for coordinate transformation is necessary. The $\vec{n}$ can be coincided with the Z-axis by causing the normal vector to coincide with the Z-axis, calculating both in the directions of axes X and Y according to the expressions below, if it is assumed that the parameters of $\theta$ and $\psi$ for $\vec{n}$ are known as shown in FIG. 37.

Z-axis;

$$\left. \begin{array}{l} \vec{Tu} = \vec{Tu} \cdot M_1 \\ \vec{Tv} = \vec{Tv} \cdot M_1 \\ \vec{V} = \vec{V} \cdot M_1 \end{array} \right\} \quad (37)$$

where $M_1 = \begin{pmatrix} \cos\psi & -\sin\psi & 0 \\ -\sin\psi & \cos\psi & 0 \\ 0 & 0 & 1 \end{pmatrix}$ Y-axis;

$$\left. \begin{array}{l} \vec{Tu} = \vec{Tu} \cdot M_2 \\ \vec{Tv} = \vec{Tv} \cdot M_2 \\ \vec{V} = \vec{V} \cdot M_2 \end{array} \right\} \quad (38)$$

where $M_2 = \begin{pmatrix} \cos\theta & 0 & \sin\theta \\ 0 & 1 & 0 \\ -\sin\theta & 0 & \cos\theta \end{pmatrix}$ The relation between coordinate systems $\vec{Tu}$ and $\vec{Tv}$ on the X-Y plane is shown in FIG. 38. Respective component of $\vec{V}'$ against the $\vec{Tu}$ and $\vec{Tv}$ coordinate systems having such relation are obtained next. If the component of $\vec{V}'$ is expressed as (Vx,Vy,Vz), the $\vec{Tu}$ component becomes $$Tu = Vx \cos\theta - Vy \sin\theta \quad (39)$$

and $\vec{T}v$ component becomes $$Tv = Vx \sin \psi + Vy \cos \psi \quad (40)$$

The expression (34) will possibly be more satisfied with a position which is obtained by displacing the initial parameters u1 and v1 by the amount of parameter equivalent to the values obtained in accordance with the expressions (39) and (40). The new parameter position will be calculated as below wherein the lengths of the boundaries of the patches u and v are Du and Dv, $$u1 = u1 + \frac{Tu}{Du} \quad (41)$$
$$v1 = v1 + \frac{Tv}{Dv}$$

The polarity of the evaluation function is a necessary data to discriminate the 3-dimension shape which is defined with surfaces. The polarity is preferably negative inside the shape and positive outside. The basic criterion to discriminate the shape which is represented with surfaces is the relation against surface normals. This invention uses a method to determine the polarity with the angle formed between the surface normal and evaluation vector. The following expression is calculated for $\vec{V}'$ which satisfies the expression above (23).

$$AN = \frac{\vec{n}}{|\vec{n}|} \cdot \frac{\vec{V}'}{|\vec{V}'|} \quad (42)$$

It is found that when the angle formed between $\vec{n}$ and $\vec{V}'$ is 90° if AN is negative $\vec{n}$ and $\vec{V}'$ exist substantially on the same line. The relation therefore holds as below.

$$AN \approx \begin{cases} 1; & \text{same direction for the surface normal vector} \\ -1; & \text{inverse direction for the surface normal vector} \end{cases}$$

Thus evaluation function can be effective in discrimination of inside of the form from outside is obtained as below.

$$V = |\vec{V}| \cdot \frac{AN}{|AN|} \quad (43)$$

There exists a scope of domains where such evaluation function on surface boundaries is applicable. The evaluation function is represented with the distance in the surface normal direction of the planes which expresses a form on an arbitrary scanning point. Therefore, as shown in FIG. 39, the application is limited to a certain scope. But in practice when evaluation function is calculated, the result of the expressions (28) and (29) may not exist within the scope. As the position does not exist on the surface 1, it is impossible to draw a surface normal from the position toward the scanning point. A special processing is therefore called for.

Figure 40:
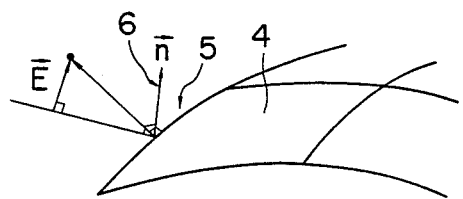
Figure 41:
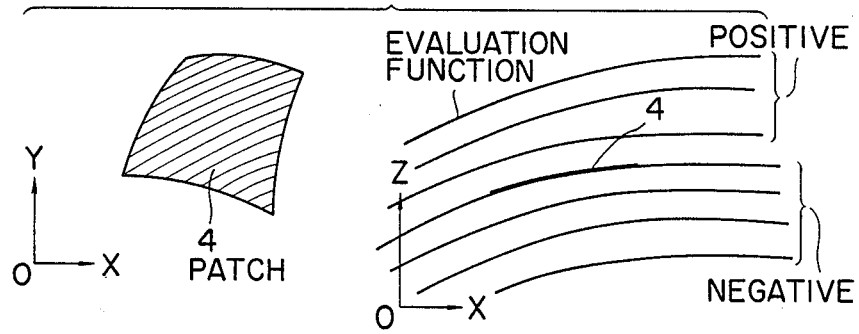
Figure 42:
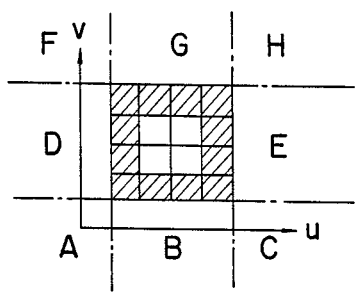
Figure 43:
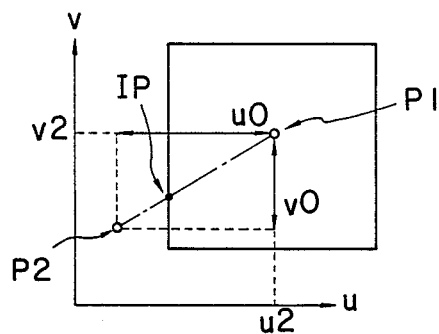

The vector $\vec{E}$ shown in FIG. 40 is assumed herein to be the evaluation vector. More particularly, the vector is assumed to orthogonally intersect the boundary line 5 of a patch 4 which has a surface normal 6 vertical thereto. The vertical vector thereof is designated as an evaluation vector $\vec{E}$. With the evaluation vector $\vec{E}$, the distance from the patch surface 4 can be distinguished as shown in FIG. 41, though approximately, to specify the positional relation (i.e. front surface or back surface; above or underneath) from the surface 4. This operational expression discriminantes to which domains of A through H the results of the above expressions (28) and (29) belong as shown in FIG. 42. This is the discrimination of domain on the parametric space. This discrimination is easily conducted if a function $F(u,v) \leq 0$ which makes the domain representing the inside of a form negative on the parametric space is prepared for each boundary (4 in number) to be compared with each other. Consequently, as shown in FIG. 43, an intersection IP of the form boundary with a linear line obtained by connecting the search point P1 on the parametric space and the result P2 of the above expressions (28) and (29) is obtained. As the linear expression is as shown below, the intersection IP is obtained easily.

$$v = \frac{v0}{u0} u + \frac{v2 \cdot u0 - v0 \cdot u2}{u0} \quad (44)$$

Based on these parameters, next processing for $\vec{V}$ is conducted. If the result P2 of the expressions (28) and (29) still remains outside of the domain after above processing, the boundary and scan point are searched in a manner shown in FIG. 44 to obtain the parameters u and v as expressed below.

$$\vec{V}' \cdot \vec{T} = 0 \quad (45)$$

Figure 44:
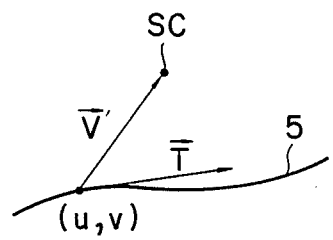
Figure 45:
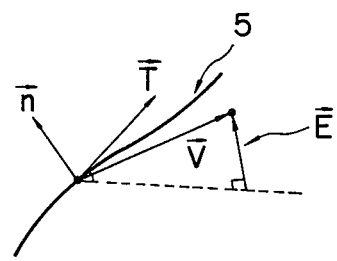

The polarity to obtain the evaluation function shown in FIG. 39 is identical to the above. In FIG. 44, the distance between the above points (u,v) and the scanning point SC is represented with vector $\vec{V}'$ on the boundary 5, and the tangent vector on the points (u,v) with $\vec{T}$. FIG. 45 shows the method for obtaining the result of the expression (45).

By evaluating the free surface in the manner mentioned above, it becomes possible to obtain the line of intersection of the two free surfaces to be shown below. As shown in FIG. 34, a scanning line 7 is set on either one of the two surfaces 4A and 4B, and the points on the line 7 are evaluated by a method according to the above method. FIG. 35 shows the relation between the evaluation function to be calculated by this method and the scanning line. At the position where the evaluation function is zero is the intersection point between the scanning line 7 and the surface 4A. If these intersecting points are obtained for all the scanning lines 7, the set of points represents the line of ontersection between the surface 4A and the surface 4B.

Figure 46:
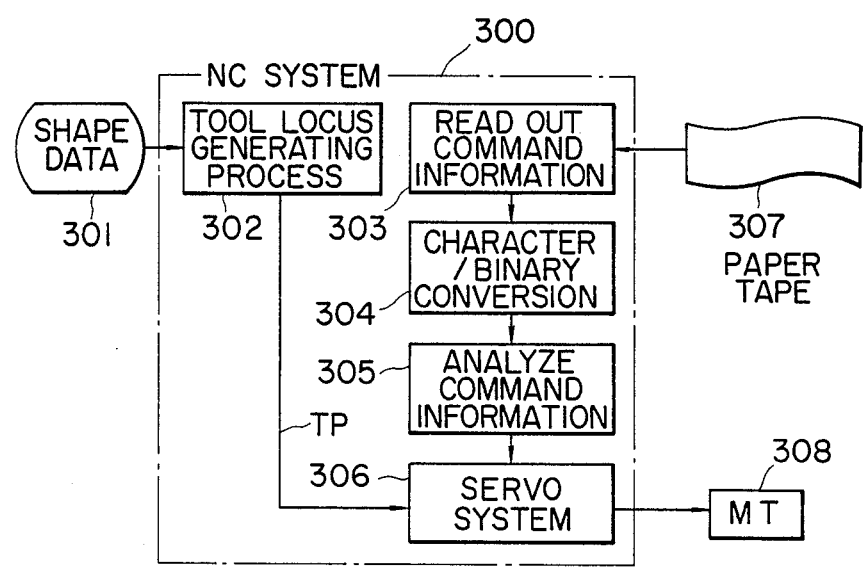
FIGS. 46 and 47 are block diagrams to show an example of an application of this invention method for an NC system.
Figure 47:
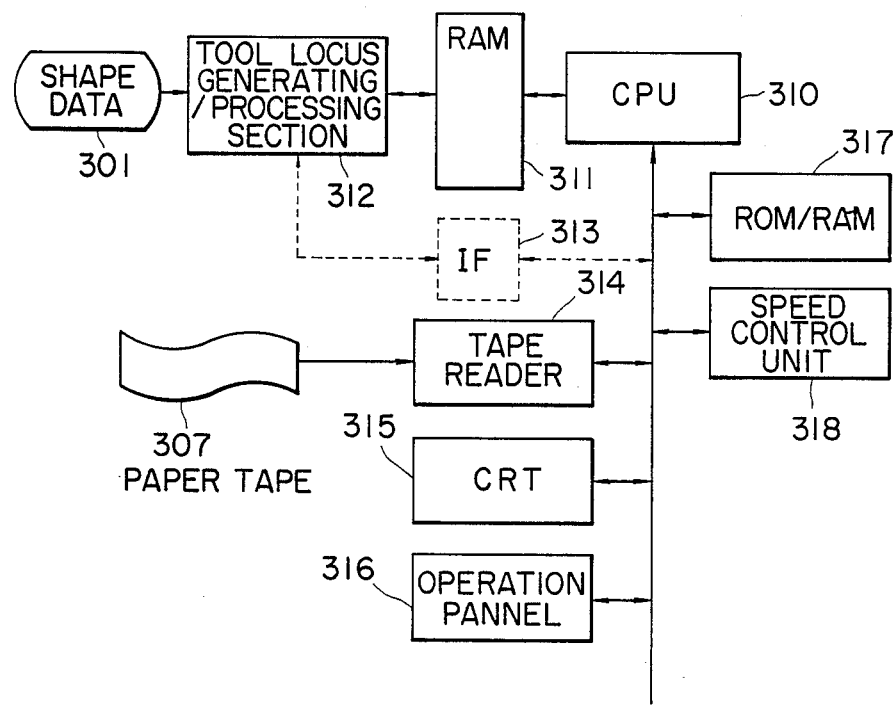

FIG. 46 shows the processing flow of an NC system 300 which incorporates aforementioned tool locus generating function 102. In the practice, the NC information recorded on a paper tape 307 is read out (303), the NC information expressed in character images is converted into binary data (304), the binary data is processed to analyze the command information (305), and then processed in a servo system (306) to supply the output therefrom to a machine tool 308. When the NC system 300 is incorporated with a tool locus generating process 302, it becomes possible to output linear binary data and it needs no command information analysis because it is a succession of linear interpolations, thereby enhancing the speed in processing. The incorporation of such a function is further effective in that if the shape data 301 is inputted to generate a tool locus TP for a servo system 306, processing work can be conducted according to the inputted shape data. If the aforementioned shape extraction processing unit 40 is installed within an NC system 300 as a tool locus generating process 302, the whole shape information TS which have been processed in set operation can be utilized as the tool tracing TP. The NC command information required for manufacturing a complicated shape generally amounts to a large volume and presents a problem in handling. The shape data for tool locus generating process 302, on the other hand, can be extremely compact and handling is easier. FIG. 47 shows an example of hardware structure in the NC system 300. The connection between the tool locus generating/processing section 312 with a conventional control unit may be by either one of the two methods; one method fully takes advantages of the structure wherein the tool locus generating/processing section 312 is incorporated internally. As shown with solid lines in the drawing, a RAM 311 is provided to be shared by the generating/processing section 312 and a CPU 310 in the NC control unit and information is transferred through the RAM 311. This minimizes the loss time in information transmission and increases the speed in processing. Another method is to install an interface 313 as shown by the broken lines between the conventional NC control unit and the generator. The processing speed according to this method, however, is slow as the processing speed is affected by the speed in data transmission.

Figure 48:
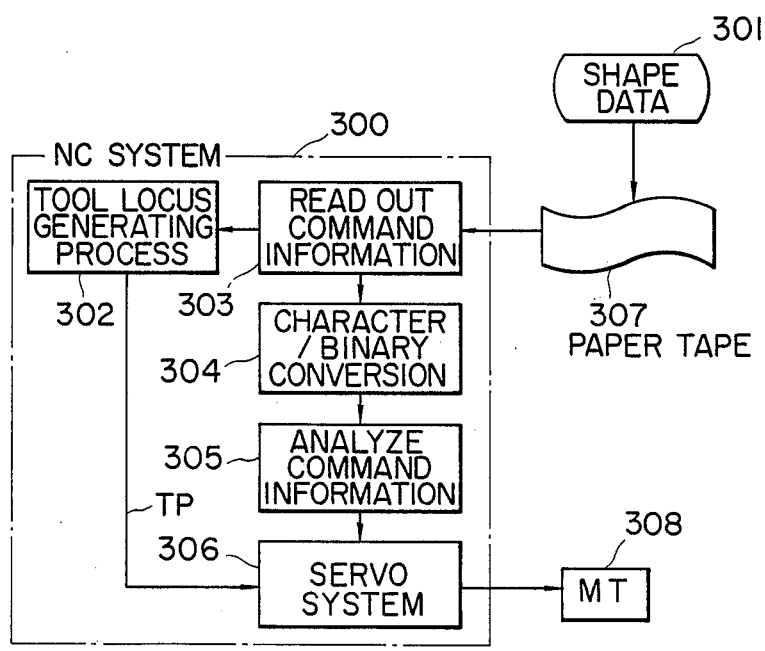
FIG. 48 is a block diagram to show another embodiment of this invention system.

Although the shape data 301 is directly processed in the NC system 300 to generate the locus of a tool (302) in FIG. 47, it is possible to input the shape data on the paper tape 307 together with the NC information as shown in FIG. 48, and discriminate the data into the NC information and the shape data at the time of reading out the command information for classification.

As described in the foregoing, the evaluation method according to this invention can differentiate domains of free surfaces with CSG and therefore is applicable to conventional units. It is also applicable to CAD/CAM effectively.

This invention relates to an NC unit of the type which is incorporated with such functions as that to input manufacturing conditions, simulate tool locus and generate the tool locus of an automatic programming system without a shape data input function. The NC program prepares precise geometric information of an object to be worked with aforementioned shape modeling system, and if necessary, working conditions for the manufacturing processes. Geometric information of an object and working condition information will be used as the data to feed the NC unit. These data would not accumulate to as large a volume as in the case of NC command information even if the shape of the object is complicated. This greatly facilitates handling of the information. A machine tool operator, when handed over such information, checks the working process by using the tool locus simulation incorporated in the NC unit, and if he judges it necessary, he modifies the working conditions. As this invention unit includes a modification function, the process step needs to return to the level of NC programming for modification. Moreover, as the know-how of the operator in charge of the machining process can be well reflected on the stop, the degree of freedom in manufacture becomes enhanced. The structure of the reverse Polish notation is used in the data structure in the automaic programming system and a system using a normal vector preparation algorithm is used as the basic system for free curved surfaces in the above description, but other automatic programming system may achieve similar effects.

As described in detail in the foregoing, the problems encountered in the prior art, and more particularly the problems in NC command information processing and modification encountered when NC manufacturing is conducted with the automatic programming can be solved by incorporating the automatic programming function within the NC unit.

Figure 49:
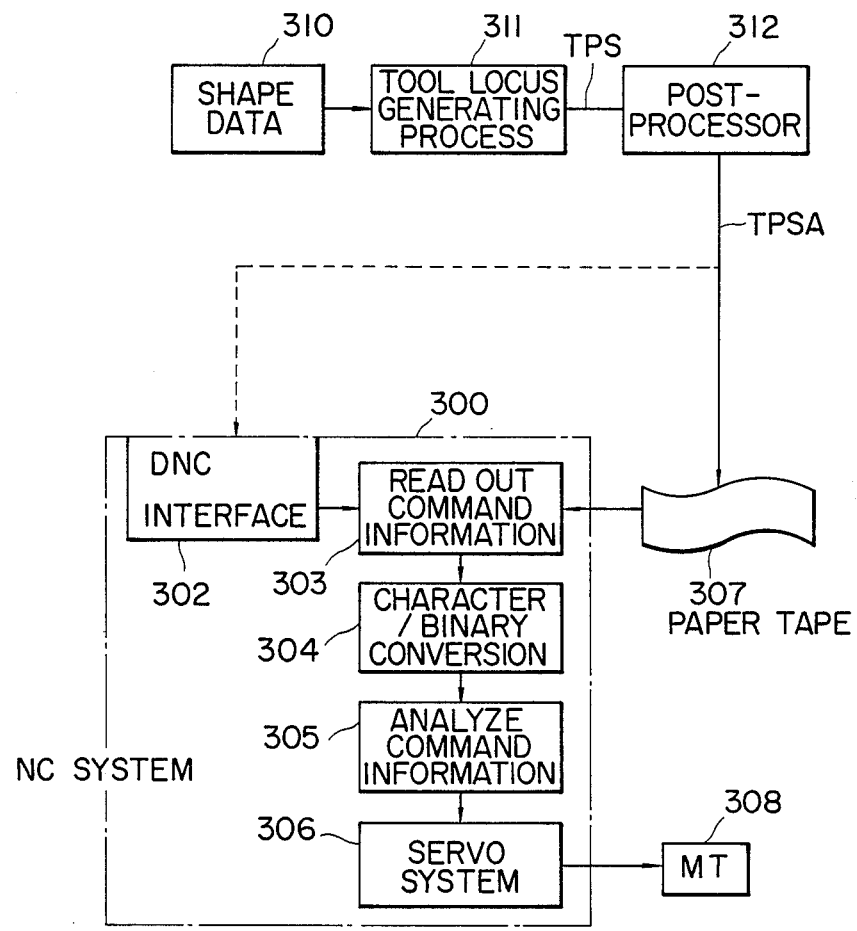
FIGS. 49 and 50 are block diagrams to show examples of an application of this invention method for an NC system, respectively.

FIG. 49 shows the flow of the data which is given to the NC system 300 to indicate the tool locus. The tool locus data TPS is fed to a postprocessor 312, processed according to a prescribed method, and either punched on a paper tape 307 as the locus data TPSA of taken in the NC system 300 via an interface 302 for DNC (Direct NC). The locus data TPSA is read in process (303) from the paper tape 307 or from the DNC interface 302, and the data in character image is converted into the data in binary (304). Based on the binary data, the command information is processed for analysis (305) and for a servo system (306), and the output thereof is supplied to a machine tool 308. The NC system 300 can therefore use the data on the whole shape which have been operated in set as the tool locus data TP. The NC command information necessary for manufacturing a complicated shape generally accumulates to a large volume to present difficulties in handling while the shape data for tool locus generating process 311 remains compact to allow simple handling.

Figure 50:
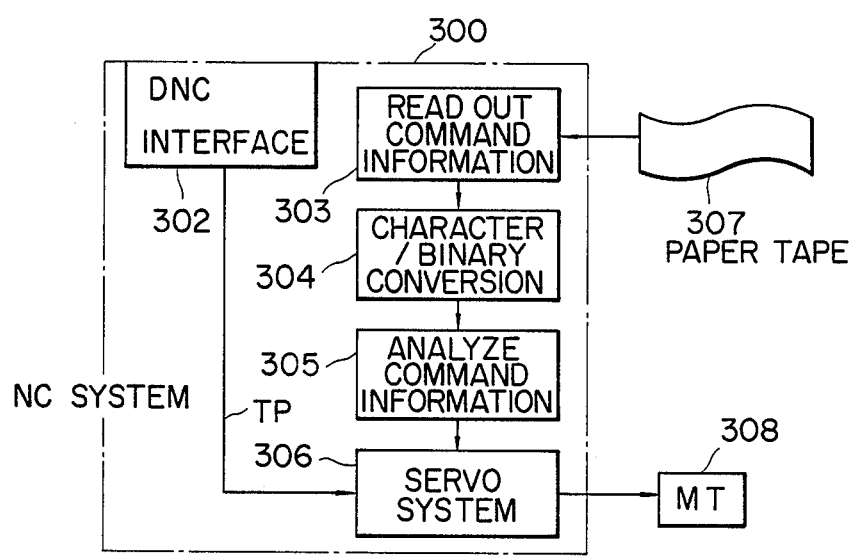

In the diagram in FIG. 49, the data from the DNC interface 302 is read in as command information, but it may be the servo data shown in FIG. 50 for servo processing.

As described in the foregoing, the NC tool locus generator system according to this invention can specify a domain for free surfaces, too, and hence can represent an arbitrary surface in the real space, greatly enhancing the degree of freedom in tool trace generation.

It should be understood that many modifications and adaptations of the invention will become apparent to those skilled in the art and it is intended to encompass such obvious modifications and changes in the scope of the claims appended hereto.

What is claimed is:

1. A CAD/CAM system comprising a shape data input unit which can input various kinds of shape data including free surfaces, a shape extraction processor for obtaining a distance of an arbitrary position data from a function which represents a shape in a real space as well as in a parametric space for conducting set operation with object structure data on said shape and a display unit for displaying said shapes based on a whole shape data outputted from said shape extraction processor.

2. The CAD/CAM system as claimed in claim 1 wherein said display unit is a CRT.

3. The CAD/CAM system as claimed in claim 1 wherein a shape data transmitted from said shape data input unit is discriminated as one of mathematically expressible data, a free surface data or object structure data.

4. The CAD/CAM system as claimed in claim 3, wherein said shape extraction processor comprises a mathematical shape process for inputting said mathematically expressible data, a free surface evaluation/operation process for inputting said free surface data, a shape information stack area for inputting processed informations in said mathematical shape process and said free surface evaluation/operation process, and a set operation for inputting said object structure and an output of said shape information stack area.

5. An NC system which is provided with three dimensional automatic programming function, comprising a shape data input unit which can input various kinds of shape data including free surfaces, a shape extraction process which obtains the distance from arbitrary position data corresponding to a function which represents a shape in a real space as well as a parametric space for conducting set operation with object structure data on said shape, and a tool locus generating unit which generates the trace of a tool based upon the whole shape data outputted from said shape extraction processor.

6. A shape modeling system in CAD system comprising a shape data input unit which can input various types of shape data including free surfaces, a shape extraction processor which obtains the distance of an arbitrary position data corresponding to a function which represents a shape in a real space as well as a parametric space and a display which displays said shape based on the whole shape data outputted from said shape extraction processor, in which shape data inputted from said shape data input unit are stored in a shape data memory, free surface data is stored in terms of vector expression, and said free surface is processed by using a normal vector generating method so that said free surface can be processed in a manner similar to those applied to shape models which are expressed by mathematical expressions.

7. The modeling system in a CAD system as claimed in claim 6 wherein said shape data are stored in said shape data memory in reverse Polish notation.

8. A shape data memory processing method in CAD/CAM system comprising a shape data input unit which can input various kinds of shape data including free surfaces, a shape extraction processor which obtains the distance of arbitrary position data corresponding to a function which represents a shape in a real space as well as a parametric space for conducting set operation with an object structure data of said shape, and a display for displaying said shape based on the whole shape data outputted from said shape extraction processor, in which said shape data inputted from said shape data input unit are stored in a shape data memory in reverse Polish notation, the free surface data are stored in terms of vector expression, the shape data described in said reverse Polish notation are discriminated as one of mathematically expressed data, operation codes or free surface codes, and the whole shape data are obtained according to the reverse Polish memory data in a shape data stack area.

9. A plan intersecting line method in CAD/CAM system comprising a shape data input unit which can input various kinds of shape data including free surfaces, a shape extraction processor which obtains the distance of an arbitrary position data corresponding to a function which represents a shape in real as well as parametric spaces for conducting set operation with object structure data on said shape and a display for displaying said shape based upon the whole shape data outputted from said shape extraction processor, in which an initial scan line is set on a first surface out of two intersecting surfaces, points on the first surface are parameter-interpolated, surface normal vector from a second surface intersecting is calculated, and when said surface normal vector is not zero, points on the first surface are displaced along the scan line to correspond to the magnitude of the vector, and when the surface normal vector is zero, they are stored in a memory as intersecting line coordinates, a next scan line is set consecutively until scanning on the whole surface of the first surface is completed, and the line of intersection between the first and second surfaces is extracted.

10. An NC tool path generating method comprising generating tool path data and supplying the tool path data to an NC system, which comprises the steps of:
   distributing NC machining shape data to one of mathematically expressible data, a free surface data or operation code by discriminating the NC machining shape data;
   operating the mathematically expressible shape data by using a mathematic shape normal vector expression;
   storing an operated first result in a stack;
   operating the free surface data by using a free surface normal vector expression with free surface point set data;
   storing an operated second result in the stack;
   generating whole shape data by set operations on the results stored in the stack for the operation code; and
   tracing positions which make distance from a point corresponding to said whole shape data zero thereby to generate a tool path of said NC system.

11. An NC tool path generating method as claimed in claim 10, wherein said tracing operation is carried out by using inner product of vector.

* * * * *